United States Patent
Ogami et al.

(10) Patent No.: US 9,236,617 B2
(45) Date of Patent: Jan. 12, 2016

(54) BATTERY MODULE

(75) Inventors: Etsuo Ogami, Atsugi (JP); Nobuhiro Shiraishi, Sagamihara (JP); Ryuichi Amagai, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 1934 days.

(21) Appl. No.: 11/950,705

(22) Filed: Dec. 5, 2007

(65) Prior Publication Data

US 2008/0138698 A1 Jun. 12, 2008

(30) Foreign Application Priority Data

Dec. 11, 2006 (JP) ................................. 2006-333693

(51) Int. Cl.
 *H01M 6/46* (2006.01)
 *H01M 2/10* (2006.01)
 *H01M 2/02* (2006.01)

(52) U.S. Cl.
 CPC .............. *H01M 6/46* (2013.01); *H01M 2/1061* (2013.01); *H01M 2/1077* (2013.01); *H01M 2/1083* (2013.01); *H01M 2/0207* (2013.01)

(58) Field of Classification Search
 CPC ........................................................ H01M 6/46
 USPC .......................................................... 429/452
 See application file for complete search history.

(56) References Cited

U.S. PATENT DOCUMENTS

| | | | | |
|---|---|---|---|---|
| 5,755,743 A | * | 5/1998 | Volz | ...................... A61N 1/3754 607/36 |
| 7,615,309 B2 | | 11/2009 | Kim et al. | |
| 7,659,029 B2 | | 2/2010 | Ota et al. | |
| 2003/0143459 A1 | * | 7/2003 | Kunimoto | .............. H01M 2/206 429/158 |
| 2005/0132562 A1 | * | 6/2005 | Saito | ................... H01M 4/0404 29/623.5 |
| 2006/0088761 A1 | * | 4/2006 | Ota | ........................ H01M 2/18 429/130 |
| 2007/0207377 A1 | * | 9/2007 | Han | ...................... H01M 2/021 429/162 |

FOREIGN PATENT DOCUMENTS

| | | | |
|---|---|---|---|
| EP | 1353389 A2 | 10/2003 | |
| EP | 1505670 | * 2/2005 | .............. H01M 2/10 |
| EP | 1710859 A1 | 10/2006 | |
| EP | 1798787 A2 | 6/2007 | |

(Continued)

OTHER PUBLICATIONS

An English translation of the Korean Office Action of corresponding Korean Application No. 10-2007-7005361, dated Nov. 19, 2009.

(Continued)

*Primary Examiner* — Ula C Ruddock
*Assistant Examiner* — Archer Dudley
(74) *Attorney, Agent, or Firm* — Global IP Counselors, LLP

(57) ABSTRACT

A battery module includes a plurality of flat cells and a plurality of nipping plates. Each of the flat cells has a cell main body and at least one electrode tab. The cell main body includes a power storage element sealed in a package member. The electrode tab is electrically connected to the power generating member and protruding outwardly from the cell main body. The flat cells are stacked on one another such that the electrode tabs are electrically connected in a stacking direction. Adjacent ones of the nipping plates in the stacking direction nip the electrode tab and a portion of the cell main body of a corresponding one of the flat cells from both opposite side surfaces of the corresponding one of the flat cells along the stacking direction.

15 Claims, 21 Drawing Sheets

(56) References Cited

FOREIGN PATENT DOCUMENTS

| JP | 2001-256934 A | 9/2001 |
| JP | 2004-100616 A | 4/2004 |
| JP | 2004-108340 A | 4/2004 |
| JP | 2005-166279 A | 6/2005 |
| JP | 2005-268004 A | 9/2005 |
| JP | 2006-210312 A | 8/2006 |
| KR | 2005-60187 | 6/2005 |
| KR | 2006-49327 | 5/2006 |
| WO | WO-2006/043163 A1 | 4/2006 |

OTHER PUBLICATIONS

The Office Action of corresponding Japanese Application No. 2006-333693 dated May 18, 2009.

The Office Action of corresponding Korean Application No. 10-2007-0127273 dated Nov. 26, 2009.

* cited by examiner

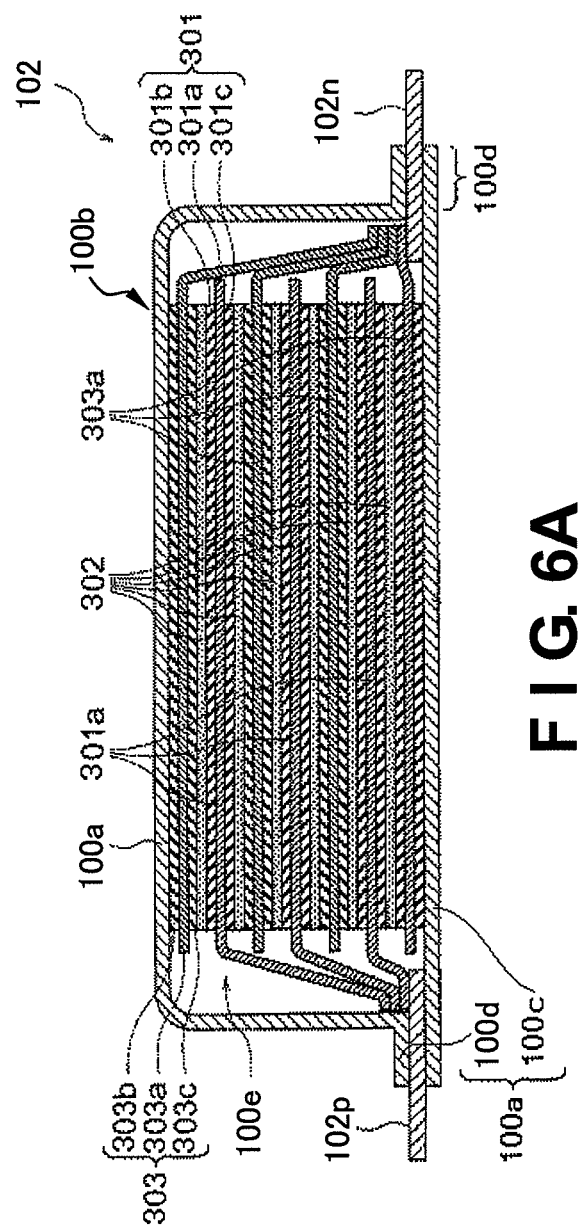
F I G. 6A

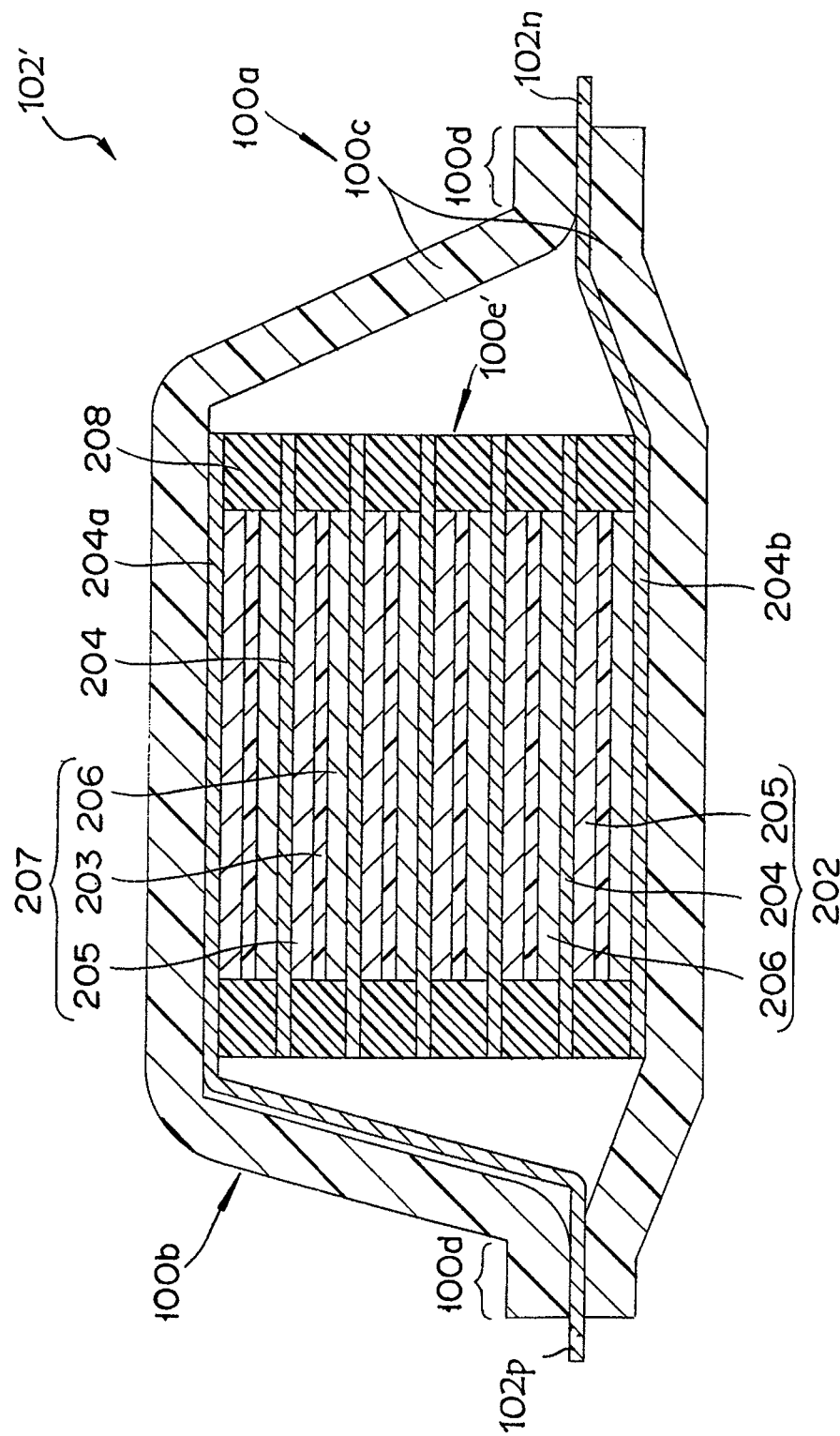
F I G. 6B

F I G. 7A
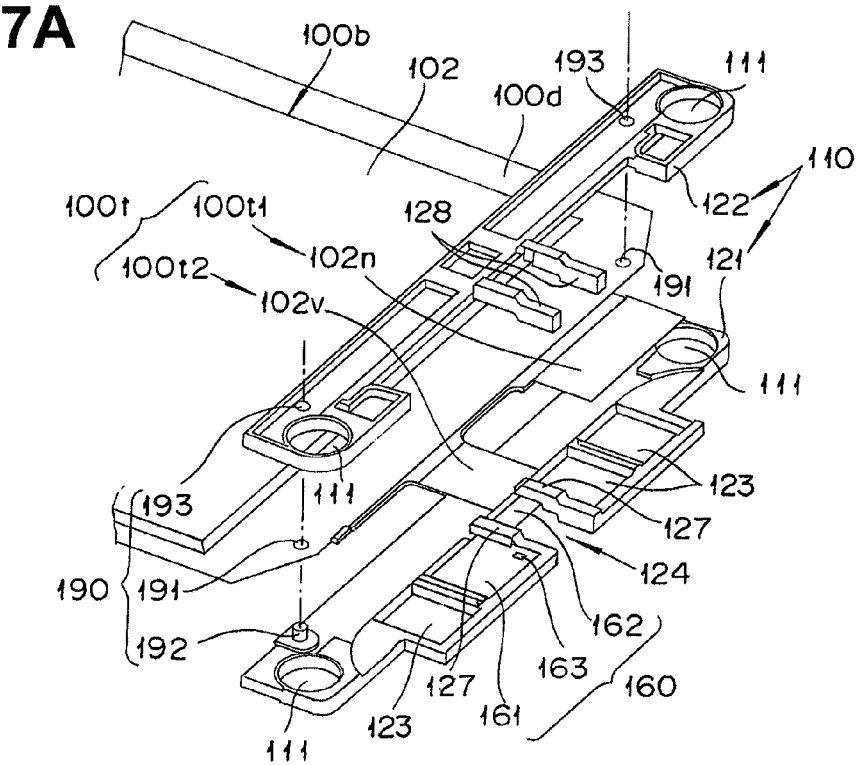
F I G. 7B
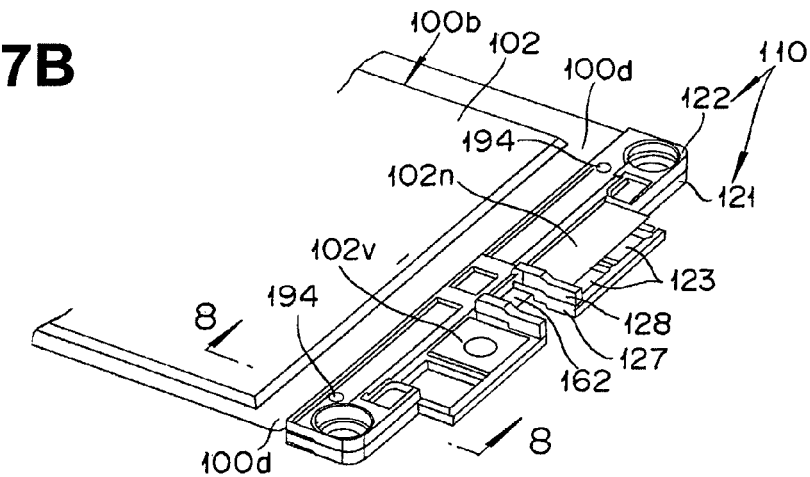

F I G. 13A
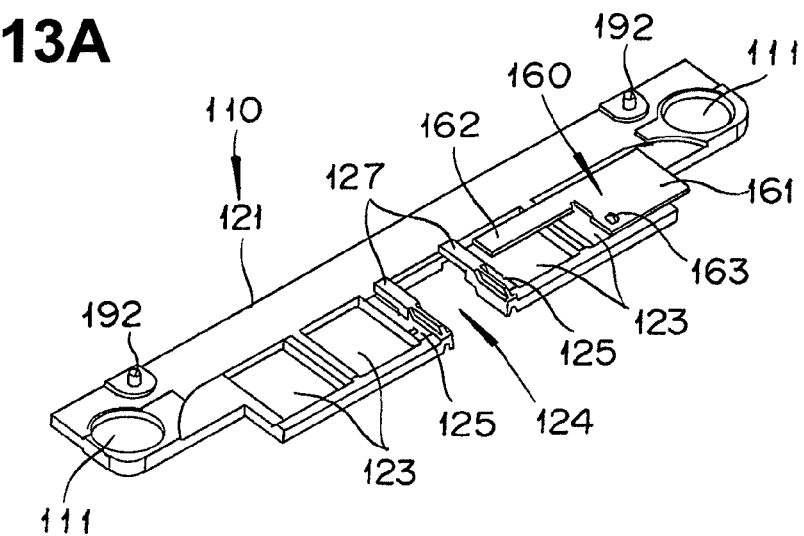
F I G. 13B
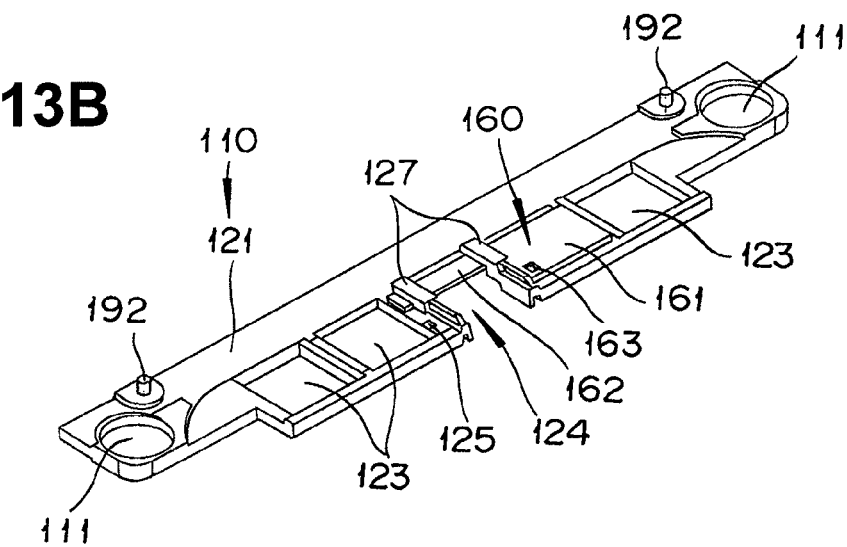

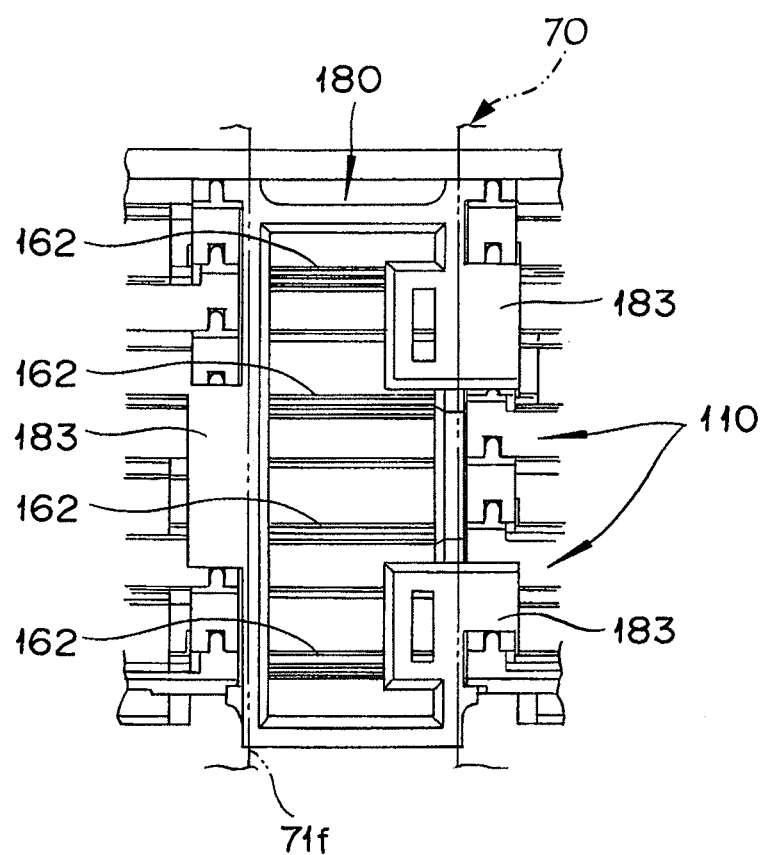
F I G. 17

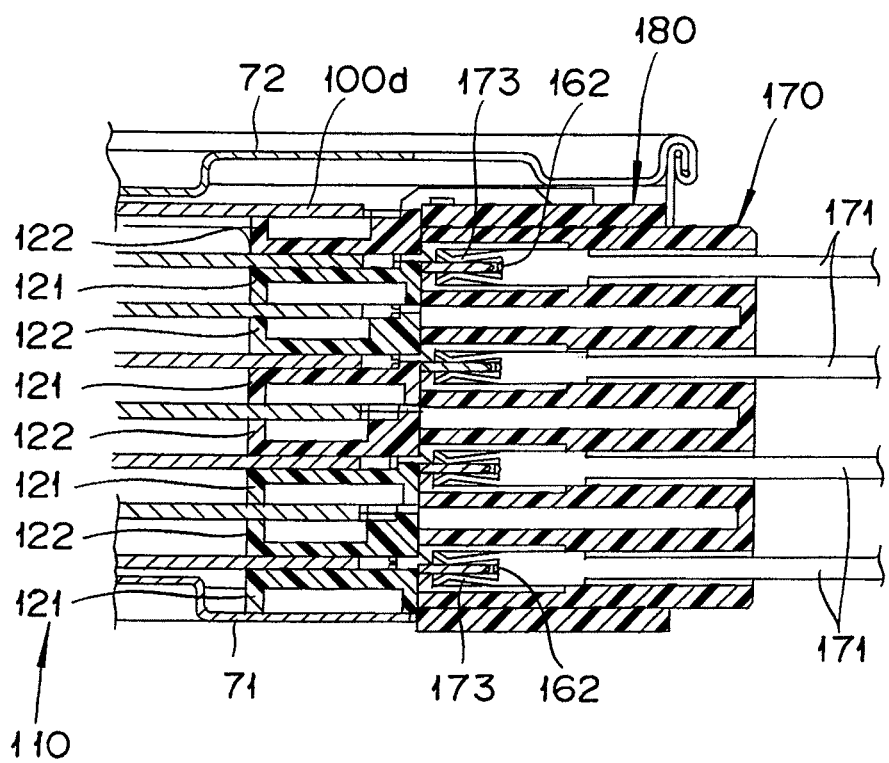
F I G. 20

F I G. 21A
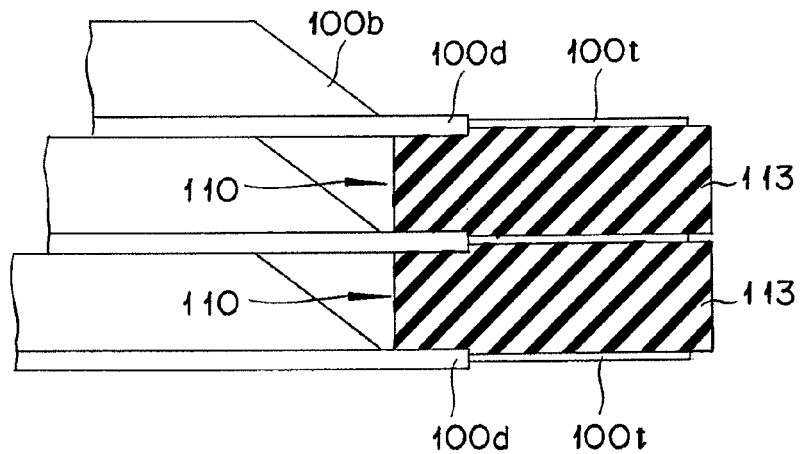
F I G. 21B
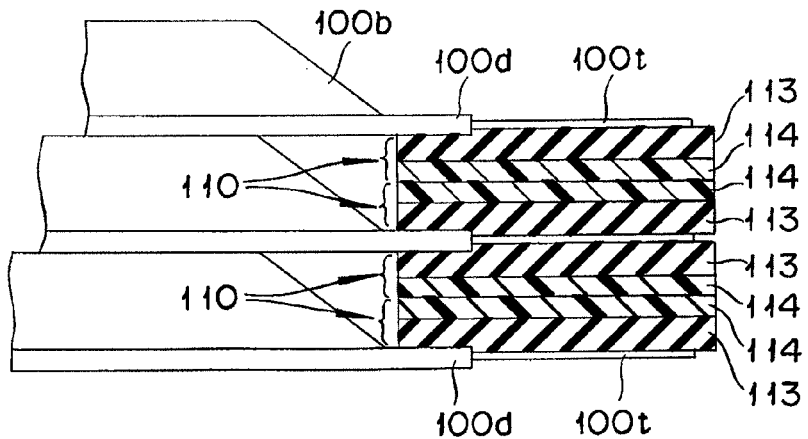

BATTERY MODULE

CROSS-REFERENCE TO RELATED APPLICATIONS

This application claims priority to Japanese Patent Application No. 2006-333693, filed on Dec. 11, 2006. The entire disclosure of Japanese Patent Application No. 2006-333693 is hereby incorporated herein by reference.

BACKGROUND OF THE INVENTION

1. Field of the Invention

The present invention relates to a battery module that contains a plurality of thin cells stacked on one another in a thickness direction of the thin cells.

2. Background Information

There is a known technology for a thin battery (cell) comprising a cell main body that is made up of a power storage element sealed in a laminate film or other package member and a thin plate-shaped electrode that is electrically connected to the power storage element and configured to lead to an outside from the cell main body. Japanese Laid-Open Patent Application Publication No. 2001-256934 discloses a battery module case in which the thin batteries are stacked in the thickness direction thereof (i.e., stacked on top of one another such that the stacking direction corresponds to the thickness direction) and electrically connected together so as to obtain a battery module having a high output and a high capacity.

In view of the above, it will be apparent to those skilled in the art from this disclosure that there exists a need for an improved battery module. This invention addresses this need in the art as well as other needs, which will become apparent to those skilled in the art from this disclosure.

SUMMARY OF THE INVENTION

When a battery module is installed in, for example, a vehicle, it is necessary to make the distance between the thin cells as small as possible in order to make the overall size of the battery module more compact. Since the electrodes of the thin cells have a thin plate-shaped form, the electrodes and the cell main bodies vibrate separately when the battery module is subjected to vibration. Consequently, there is the possibility that stresses will concentrate at the boundary portions between the electrodes and the cell main bodies. Such concentrations of stress can cause fatigue at the boundary portions and cause the strength of the boundary portions to decline. Therefore, there is a demand for a battery cell structure that is less susceptible to vibration.

Accordingly, one object of the present invention is to provide a battery module that is not readily affected by an input of vibration and can be made in a compact size In order to achieve the above mentioned object of the present invention, a battery module includes a plurality of flat cells and a plurality of nipping plates. Each of the flat cells has a cell main body and at least one electrode tab. The cell main body includes a power storage element sealed in a package member. The electrode tab is electrically connected to the power generating member and protruding outwardly from the cell main body. The flat cells are stacked on one another such that the electrode tabs are electrically connected in a stacking direction. Adjacent ones of the nipping plates in the stacking direction nip the electrode tab and a portion of the cell main body of a corresponding one of the flat cells from both opposite side surfaces of the corresponding one of the flat cells along the stacking direction.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 6A is a simplified cross sectional view of a first example of the thin cell of the battery module (cell) in accordance with the illustrated embodiment;

FIG. 6B is a simplified cross sectional view of a second example of the thin cell of the battery module (cell) in accordance with the illustrated embodiment;

FIG. 7A is an enlarged partial exploded view illustrating a front side portion of the thin cell illustrated in FIG. 5 which is coupled to a spacer in accordance with the illustrated embodiment of the present invention;

FIG. 7B is an enlarged partial perspective view illustrating a state in which the front side portion of the thin cell illustrated in FIG. 7A is coupled to the spacer in accordance with the illustrated embodiment of the present invention;

FIG. 13A is a perspective view of the spacer illustrated in FIG. 12 showing a state before the voltage detection terminal plate is attached to the spacer in accordance with the illustrated embodiment of the present invention;

FIG. 13B is a perspective view of the spacer illustrated in FIGS. 12 and 13A showing a state after the voltage detection terminal plate is attached to the spacer in accordance with the illustrated embodiment of the present invention;

FIG. 17 is a partial front elevational view of the cell unit and the holder illustrated in FIGS. 16A and 16B after the holder has been attached to the spacers in accordance with the illustrated embodiment of the present invention;

FIG. 20 is a partial cross sectional view of the battery module and the connector taken along a section line 20-20 of FIG. 18B in accordance with the illustrated embodiment of the present invention;

FIG. 21A is a simplified partial cross sectional view of the battery module and the spacer showing a first example of the material of the spacer in accordance with the illustrated embodiment; and FIG. 21B is a simplified partial cross sectional view of the battery module and the spacer showing a second example of the material of the spacer in accordance with the illustrated embodiment.

DETAILED DESCRIPTION OF THE PREFERRED EMBODIMENTS

Selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
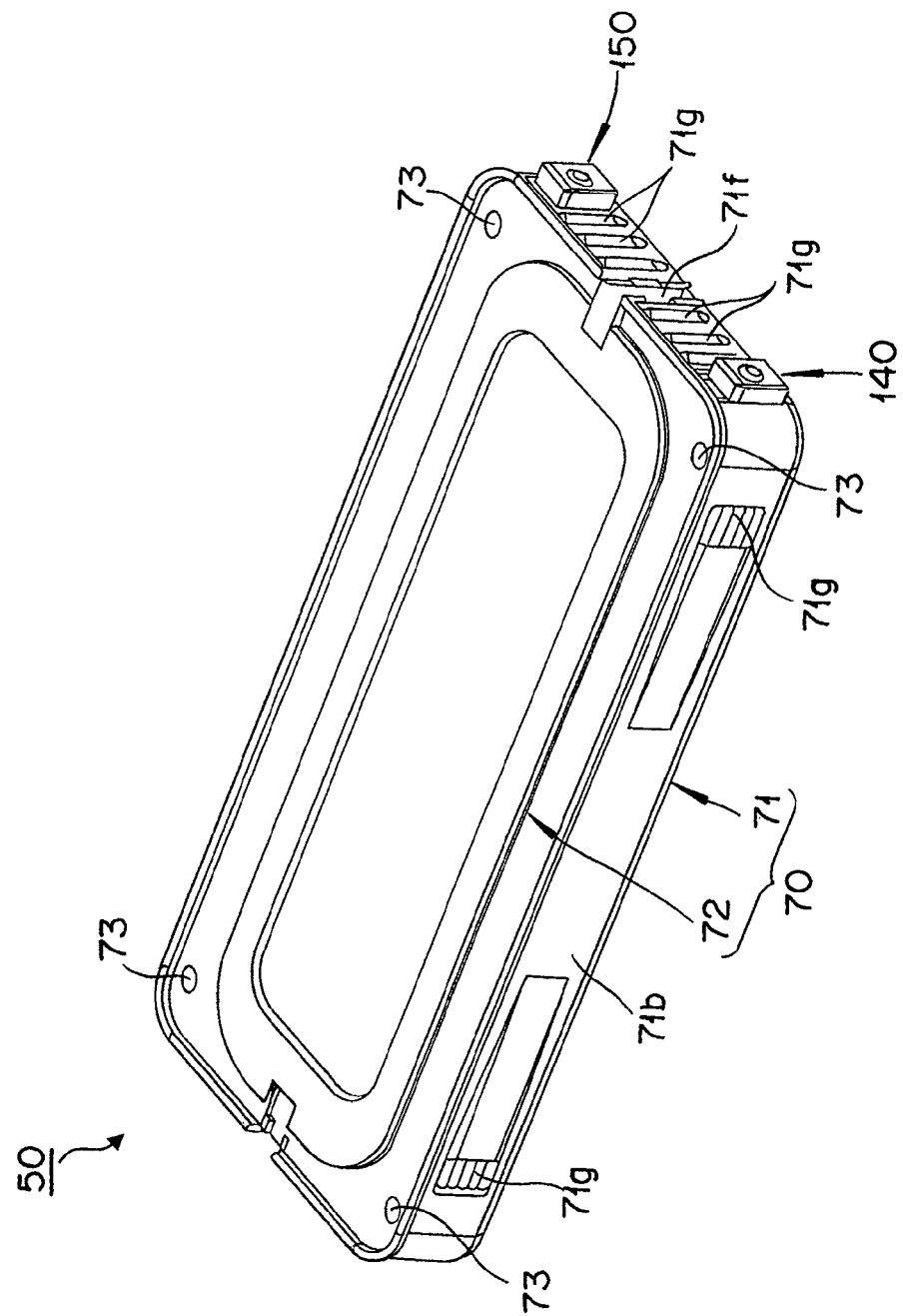
FIG. 1 is an overall perspective view of a battery module in accordance with one embodiment of the present invention.
Figure 2:
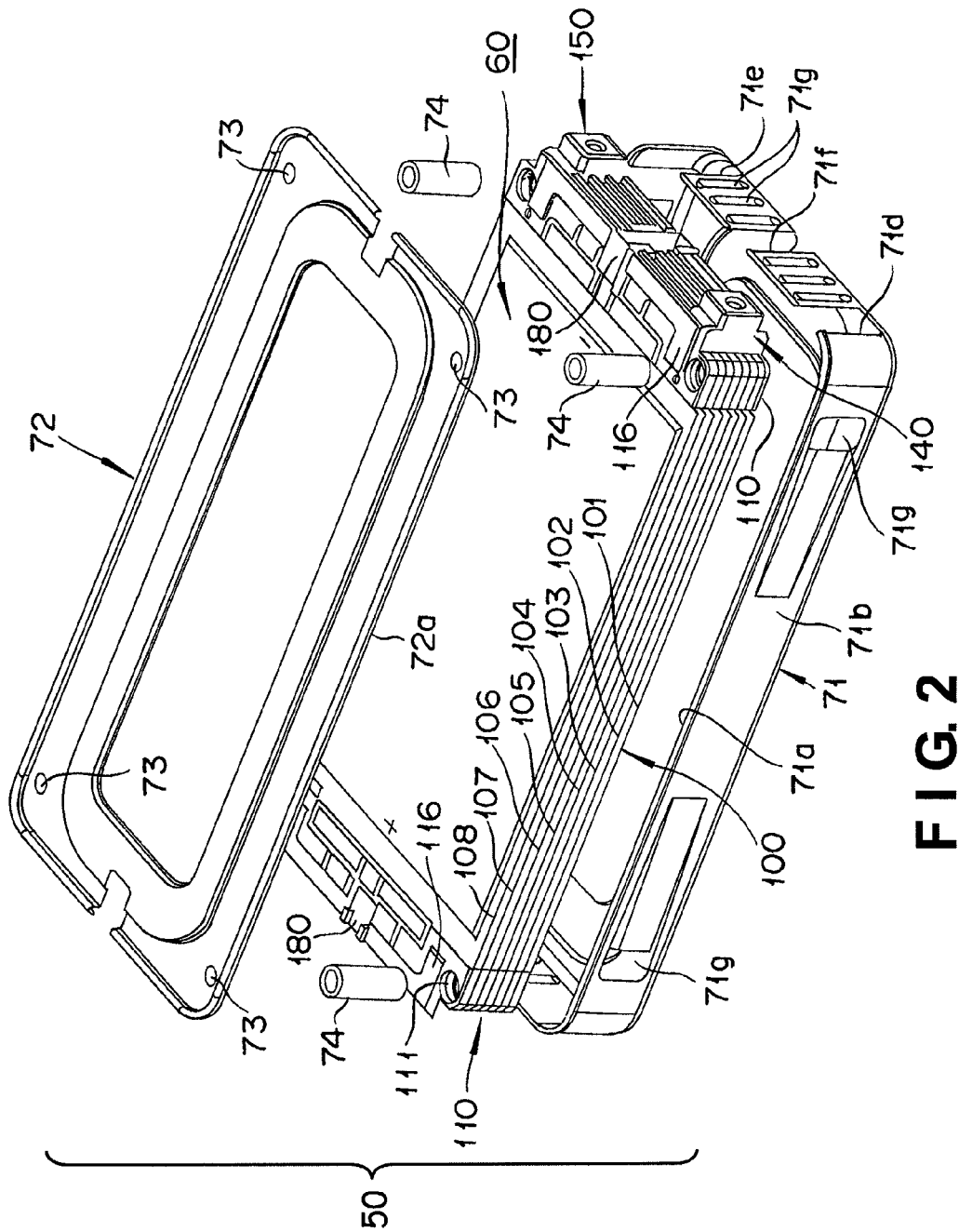
FIG. 2 is an exploded perspective view of the battery module shown in FIG. 1 in accordance with the illustrated embodiment of the present invention.
Figure 3:
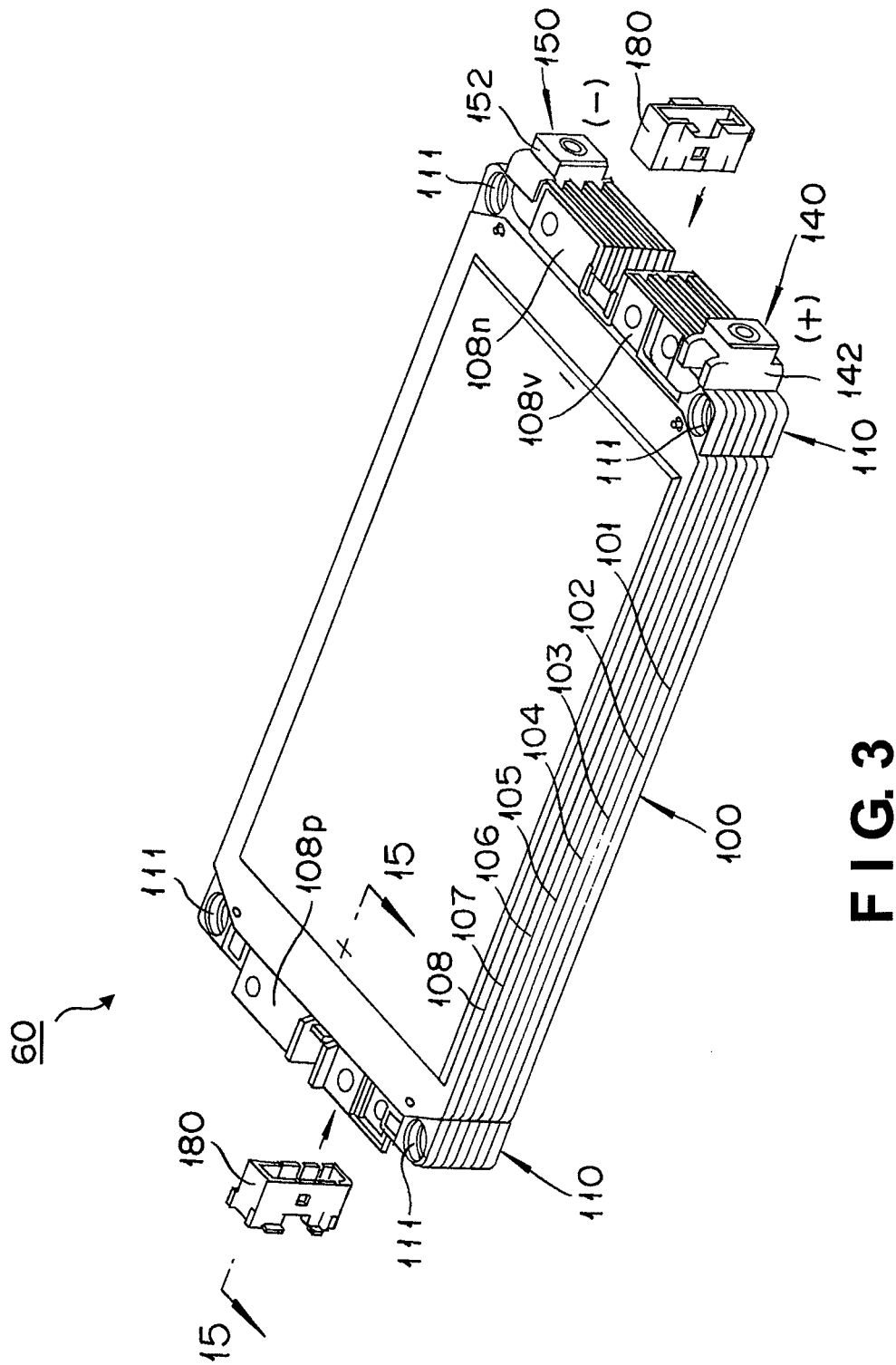
FIG. 3 is a perspective view of a cell unit of the battery module illustrated in FIGS. 1 and 2 as removed from a case of the battery module in accordance with the illustrated embodiment of the present invention.
Figure 4:
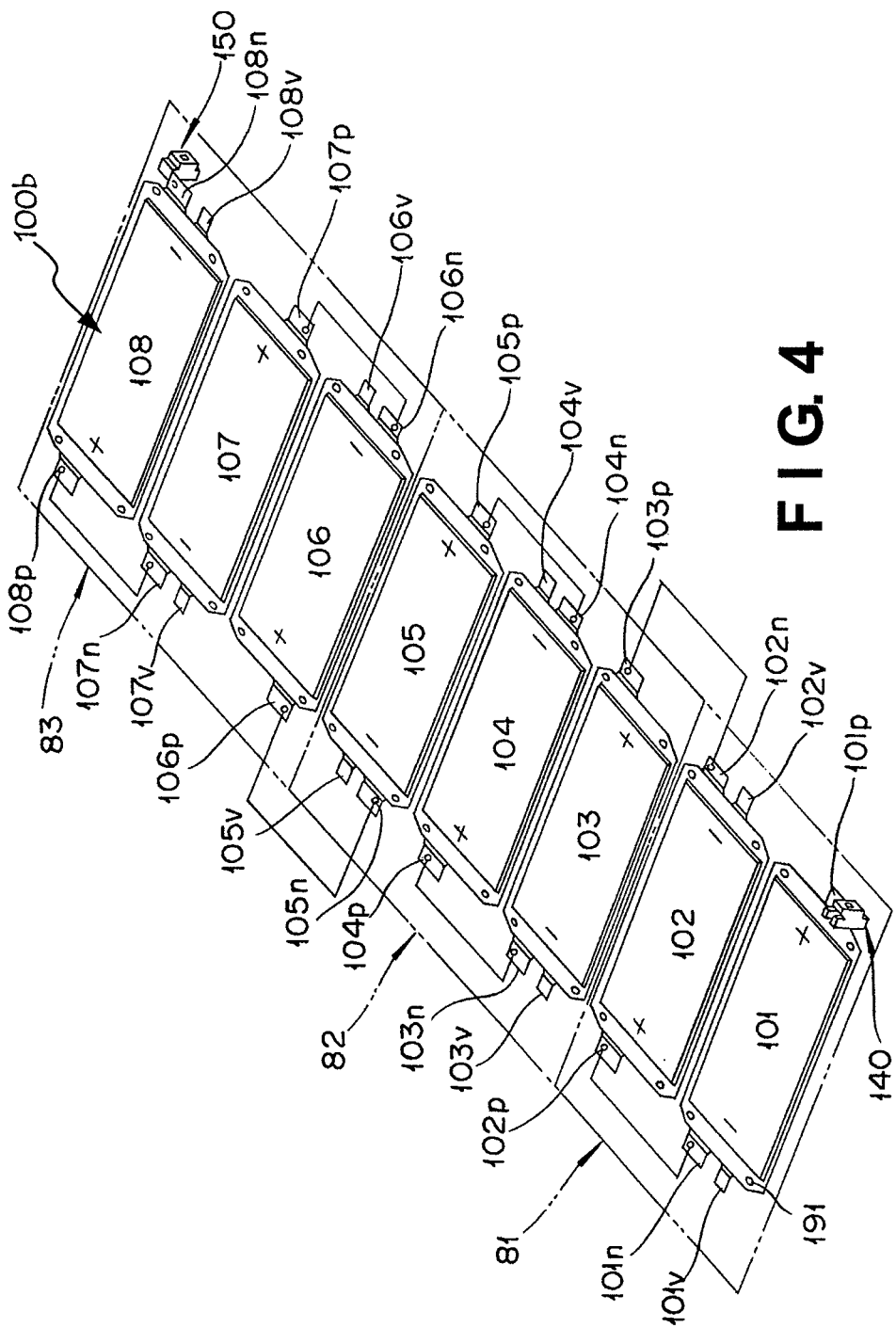
FIG. 4 is an exploded perspective view of a plurality of thin cells that form the cell unit of the battery module illustrated in FIG. 3 in accordance with the illustrated embodiment of the present invention.

Referring initially to FIGS. 1 to 4, a battery module 50 is illustrated in accordance with one embodiment of the present invention. More specifically, FIG. 1 is an overall perspective view of the battery module 50 in accordance with an embodiment of the present invention. FIG. 2 is an exploded perspective view of the battery module 50 shown in FIG. 1. FIG. 3 is a perspective view of a cell unit 60 of the battery module 50 as it appears when removed from a case 70 in which the cell unit 60 is housed. FIG. 4 is a perspective view of a plurality of thin cells 101 to 108 (flat cells) that form the cell unit 60. In the following explanation, the short side of the battery module 50 that is closer to the viewer in FIG. 1 will be called the "front side" and the short side that is farther away will be called the "rear side." Additionally, in the following explanation, the thin cells 101 to 108 are called simply "cells."

As shown in FIGS. 1 to 4, the battery module 50 includes the cell unit 60 housed inside the case 70. In the illustrated embodiment of the present invention, the cell unit 60 includes eight cells 101 to 108. The battery module 50 is arranged to be installed in a vehicle, e.g., an automobile or a train, in which vibrations occur which are transmitted to the cell unit 60.

Although it is not depicted in the figures, any number of battery modules 50 can be stacked and connected together in series or parallel in order to obtain a battery pack that has the desired current, voltage and capacity characteristics. When several battery modules 50 are connected in series or parallel, an appropriate connecting member, e.g., a bus bar, is used. The battery module 50 is air cooled and, when more than one battery modules 50 are stacked, collars are inserted between the battery modules 50 in order to provide air gaps. The air gaps serve as cooling air passages that allow cooling air to flow through and cool each of the battery modules 50. By blowing cooling air and cooling the battery modules 50, the battery temperature can be lowered and the decline of such characteristics as the charging efficiency can be curbed.

The battery module 50 is one type of battery pack (i.e., a battery having an assembly of single cells or battery units connected together) in that the battery module 50 includes the several cells 101 to 108 electrically connected together. However, in this description, the term "battery module" is used to refer to a basic unit for assembling a battery pack and has the form of a unit comprising a plurality of cells stored inside a case.

As shown in FIGS. 1 and 2, the case 70 includes a box-shaped lower case 71 having an opening 71a and an upper case 72 serving as a lid for closing the opening 71a of the lower case 71. An edge portion 72a of the upper case 72 is crimped about an edge portion of a surrounding wall 71b of the lower case 71 so as to close the opening 71a of the lower case 71. The lower case 71 and the upper case 72 are made of relatively thin steel or aluminum sheet metal that has been press-formed into a prescribed shape. The surrounding wall 71b is provided with a plurality of ventilation openings 71g for allowing cooling air to flow into the case 70.

As shown in FIGS. 2 and 3, the cell unit 60 includes a cell group 100 (plurality of flat cells), a plurality of plate-shaped spacers 110 (nipping plates), positive and negative output terminals 140 and 150, and a holder 180. The cell unit 60 is also provided with a voltage detection terminal plate 160 (illustrated in detail in FIGS. 12, 13A, 13B and 14A). The cell group 100 is made up of eight cells 101 to 108 that are stacked in the thickness direction and electrically connected in series. Each of the plate-shaped spacers 110 corresponds to a nipper plate unit that is used to stack the cells 101 to 108. The voltage detection terminal plate 160 is used to detect the respective voltages of the cells 101 to 108 (see FIG. 7A, which will be explained later). The holder 180 is mounted to the spacer 110, and is configured to hold a voltage detection connector 170 (see FIGS. 18 to 20, which will be explained later). The connector 170 is connected to a voltmeter 172 through a harness 171 (see FIG. 18), and is electrically connected to the voltage detection terminal plate 160 in order to detect the voltages of the cells 101 to 108. The voltages of the cells 101 to 108 are detected for the purpose of managing charging and discharging of the battery module 50. The spacers 110, which is attached to an upper surface of the uppermost cell 108, is coated with a foamed material 116 as shown in FIG. 2. Thus, unevenness of the height of the cell unit 60 is adjusted by the elastic deformation of the foamed material 116.

As shown in FIG. 2, the positive and negative output terminals 140 and 150 pass to the outside of the case 70 through several notches 71d and 71e formed in portions of the surrounding wall 71b of the lower case 71. An opening of the holder 180 arranged inside the case 70 faces toward the insertion opening 71f or a notch formed in a portion of the surrounding wall 71b. The insertion opening 71f allows the connector 170 to be inserted into the holder 180 from the outside of the case 70. In order to allow bolts (not shown) to be passed through four corner portions of the case 70, bolt holes 73 are provided in four corner portions of each of the lower case 71 and the upper case 72 and bolt holes 111 are provided in both transverse edge portions of each of the spacers 110. As shown in FIG. 2, a sleeve 74 is inserted into each of the bolt holes 111 of the spacers 110.

The positions of the spacers 110 are fixed with respect to the case 70 by passing the bolts through the bolt holes 73 of the lower and upper cases 71 and 72 and the sleeves 74. Since the spacers 110 are attached to the cells 101 to 108, fixing the positions of the spacers 110 also determines the positions of the cells 101 to 108 with respect to the case 70.

The structures of the eight cells 101 to 108 will now be explained with reference to FIG. 4. In order to facilitate the explanation, the cells 101 to 108 will be referred to as the first cell 101, the second cell 102, the third cell 103, the fourth cell 104, the fifth cell 105, the sixth cell 106, the seventh cell 107 and the eighth cell 108 in order from bottom to top in the stacking direction (vertical direction in FIGS. 2 and 3). In FIG. 4, the right-hand side that is closer to the viewer is the front side and the left-hand side that is farther from the viewer is the rear side. The lowermost first cell 101 is shown on the lower left and the uppermost eighth cell 108 is shown on the upper right in FIG. 4.

Each of the first through eight cells 101 to 108 includes a cell main body 100b and a pair of first electrodes (positive and negative electrodes) for connecting the cells 101 to 108 together and a second electrode for connecting to the voltage detection terminal plate 160. In FIG. 4, the first to eighth cells 101 to 108 respectively include positive electrode tabs 101p, 102p, 103p, 104p, 105p, 106p, 107p and 108p, and negative electrode tabs 101n, 102n, 103n, 104n, 105n, 106n, 107n and 108n. The positive electrode tabs 101p to 108p and the negative electrode tabs 101n to 108n correspond to the first electrodes. On the other hand, the first to eighth cells 101 to 108 respectively include electrode tabs 101v, 102v, 103v, 104v, 105v, 106v, 107v, and 108v that correspond to the second electrodes. The tabs 101v to 108v are arranged on either one of the positive electrode side or the negative electrode side. For example, as shown in FIG. 4, the tab 101v of the first cell 101 is arranged on the same side as the negative electrode tab 101n. Additionally, the tabs 101v to 108v are smaller than the positive electrode tabs 101p to 108p and negative electrode tabs 101n to 108n. In the following explanation of the illustrated embodiment, the positive electrode tabs 101p to 108p and the negative electrode tabs 101n to 108n that correspond to the first electrodes will be referred to as tabs "100t1" and the electrode tabs 101v to 108v that correspond to the second electrodes will be referred to as "tabs 100t2." When the electrodes are referred to more generally without distinguishing between first electrodes and second electrodes, the term "tabs 100t" will be used.

Moreover, in this description of the illustrated embodiment of the present invention, an "electrode tab" is defined to be a portion that leads to the outside from the cell main body 100b. In other words, the term "electrode tab" refers only the portion of an electrode that can be recognized from the outside of the cell main body 100b. In the case of a thin cell in which one end of the thin plate-shaped electrode is connected directly to the power storage element and the other end leads to the outside of the cell main body, the "electrode tab" is the portion of the electrode that extends from an edge portion of the cell main body to the other end of the electrode, i.e., the portion of the electrode that is exposed outside the cell main body. Likewise, in the case of a thin cell in which one end of the thin plate-shaped electrode is connected to the power storage element through a conductive member and the other end leads to the outside of the cell main body, the "electrode tab" is the portion of the electrode that extends from an edge portion of the cell main body to the other end of the electrode, i.e., the portion of the electrode that is exposed outside the cell main body.

As indicated in FIG. 4 with boxes drawn with double-dot chain lines, the eight cells 101 to 108 are assembled as three separate subassemblies, i.e., first, second and third subassemblies 81, 82, and 83. The first subassembly 81 is obtained by stacking the second cell 102 on top of the first cell 101 and connecting the first and second cells 101 and 102 together in series. The second subassembly 82 is obtained by stacking the third, fourth, and fifth cells 103, 104, and 105 on top of one another and connecting the third, fourth and fifth cells 103, 104, and 105 together in series. The third subassembly 83 is obtained by stacking the sixth, seventh, and eighth cells 106, 107, and 108 on top of one another and connecting the sixth, seventh, and eighth cells 106, 107, and 108 together in series.

As shown in FIG. 4, the positive electrode output terminal 140 is mounted to the first subassembly 81 and the negative electrode output terminal 150 is mounted to the third subassembly 83. The first subassembly 81 and the second subassembly 82 are electrically connected together at the front side by joining the negative electrode tab 102n of the first subassembly 81 to the positive electrode tab 103p of the second sub assembly 82. The second subassembly 82 and the third subassembly 83 are electrically connected together at the rear side by joining the negative electrode tab 105n of the second subassembly 82 to the positive electrode tab 106p of the third subassembly 83. Therefore, the first to eighth cells 101 to 108 are electrically connected in series. The second cell 102 of the first subassembly 81 is joined to the third cell 103 of the second subassembly 82 with double sided tape disposed therebetween, and the fifth cell 105 of the second subassembly 82 is joined to the sixth cell 106 of the third subassembly 83 with double sided tape disposed there-between.

As shown in FIGS. 3 and 4, the positive electrode output terminal 140 includes a plate-shaped bus bar arranged to overlap the positive electrode tab 101p of the first cell 101 and a resin cover 142 that covers a terminal section provided on an end portion of the bus bar. The negative electrode output terminal 150 includes a plate-shaped bus bar arranged to overlap the negative electrode tab 108n of the eighth cell 108 and a resin cover 152 that covers a terminal section provided on an end portion of the bus bar.

A well-known method, such as ultrasonic welding or laser welding, is used to make the joints between the respective electrode tabs 100t1, the joints between the respective electrode tabs 100t2 and the voltage detection terminal plate 160, the joint between the positive electrode tab 101p and the bus bar, and the joint between the negative electrode tab 108n and the bus bar.

Figure 5:
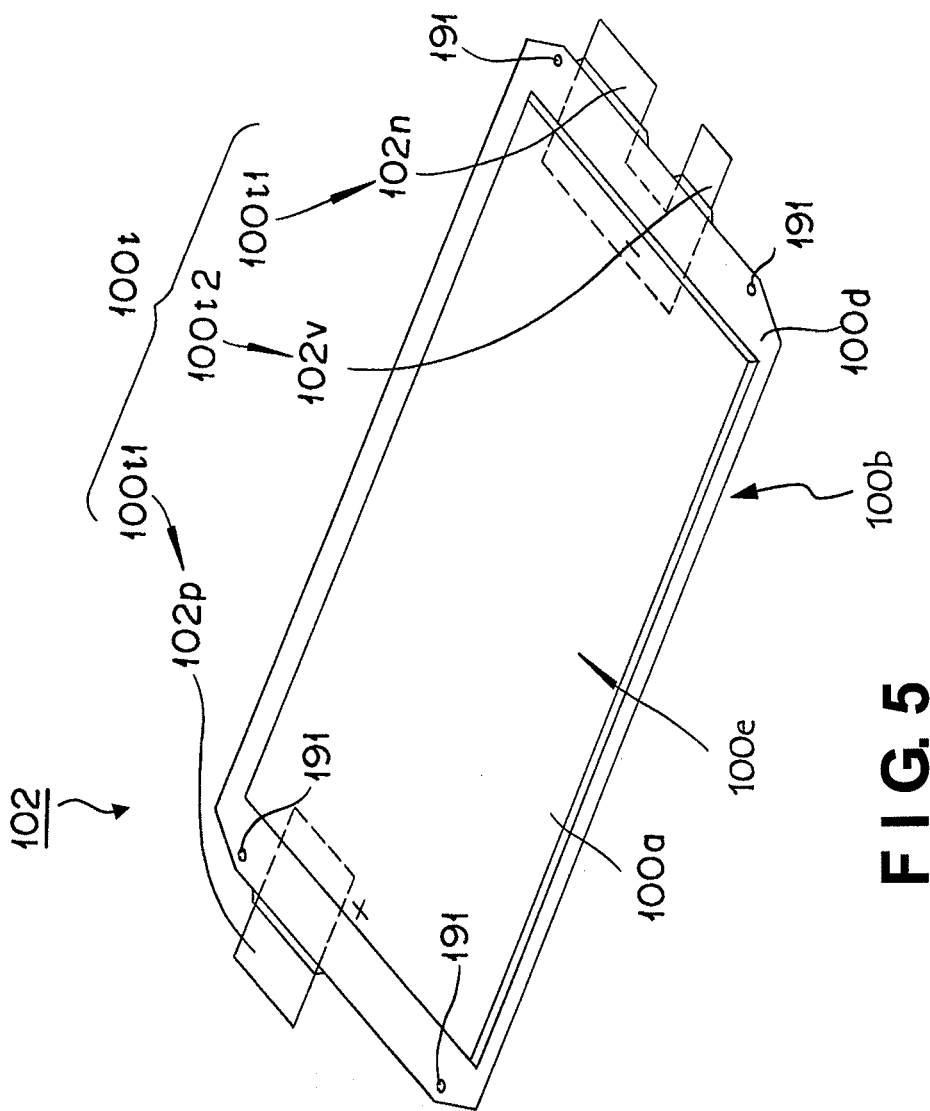
FIG. 5 is an enlarged perspective view of one of the thin cells illustrated in FIG. 4 in accordance with the illustrated embodiment of the present invention.

FIG. 5 is an enlarged perspective view showing the second cell 102 as an example of one of the cells 101 to 108. FIG. 6A is a simplified cross sectional view of a laminated-type cell, and FIG. 6B is a simplified cross sectional view of a bipolar cell.

As shown in FIG. 5, the cell 102 is, for example, a flat lithium ion secondary cell having the cell main body 100b, the positive electrode tab 102p, and the negative electrode tab 102n. The cell main body 100b includes a laminated-type power storage element 100e sealed inside a package member 100a made of a laminate film or the like. The positive electrode tab 102p and the negative electrode tab 102n are thin and plate-shaped as shown in FIG. 5. The positive electrode tab 102p and the negative electrode tab 102n are electrically connected to the power storage element 100e (power storage element or power supply element), and arranged to lead to the outside of the cell main body 100b. The positive electrode tab 102p and the negative electrode tab 102n extend from the short sides (front side and rear side) of the cell 102. In the cells 101 to 108 (which have laminated-type power storage elements 100e), it is necessary to apply pressure to the power storage elements 100e in the stacking direction in order to keep the distance between the cells 101 to 108 uniform and maintain the performance of the cells 101 to 108. Therefore, the cells 101 to 108 are enclosed inside the case 70 such that they are pressed toward each other.

FIG. 6A shows a first example of the cell 102 provided with the laminated power storage element 100e. The laminated structure of the laminated-type cell 102 is simplified and exaggerated in FIG. 6A to facilitate the understanding of the present invention. The power storage element 100e of the laminated-type cell 102 comprises a plurality of positive electrodes 301 and a plurality of negative electrodes 303 separated by a plurality of separators 302. Each of the positive electrodes 301 includes a current collector 301a having a pair of positive electrode active material layers 303b and 303c formed on both sides thereof. Each of the negative electrodes 303 includes a current collector 303a having a pair of negative electrode active material layers 303b and 303c formed on both sides thereof. The separators 302 are made of a mesh-like insulator and form electrolyte layers with an electrolytic liquid that fills an inner space of the laminated-type cell 102 which is enclosed by the package member 100a. The alternating arrangement of the positive electrode active material layers 301b and the negative electrode active material layers 303c facing generally parallel to one another with electrolytic layers being disposed therebetween forms a power storage element 100e (power generating element or power supply element).

The current collectors 301a of the positive electrodes 301 and the current collectors 303a of the negative electrodes 303 are welded to the positive electrode tab 102p and the negative electrode tab 102n, respectively. In the illustrated embodiment shown in FIG. 6A, there are three positive electrodes 301 and four negative electrodes 303 that are stacked alternately on top of one another and connected in parallel inside the laminated-type cell 102.

The power storage element 100e is sealed with the package member 100a to form the cell main body 100b of the cell 102. In the laminated-type cell 102 shown in FIG. 6A, the positive electrode tab 102p has a thin plate-shaped that extends inside the cell main body 100b and leads to the outside of the cell main body 100b. The negative electrode tab 102n has a thin plate-shaped that extends inside the cell main body 100b and leads to the outside of the cell main body 100b.

FIG. 6B illustrates an alternative structure of a cell 102' which is arranged as a bipolar cell provided with a laminated power storage element 100e'. The laminated structure of the laminated-type cell 102' is simplified and exaggerated in FIG. 6B in order to facilitate the understanding of the present invention. The power storage element 100e' of the bipolar cell 102' comprises a stack of a plurality of bipolar electrodes 202 with a plurality of electrolyte layers 203 disposed alternately therebetween. Each of the bipolar electrodes 202 comprises a current collector 204 with a positive electrode active material layer 205 formed on one side and a negative electrode active material layer 206 formed on the other side. The positive electrode active material layer 205, the electrolyte layer 203, and the negative electrode active material layer 206 constitute a single cell layer 207. An insulation layer 208 is provided around the perimeter of each of the single cell layers 207 to insulate with respect to the adjacent current collector 204. The outermost current collector 204a at the top of the power storage element 100e' in the figure is provided with only a positive electrode active material layer 205, and the outermost current collector 204b at the bottom of the power storage element 100e' in the figure is provided with only a negative electrode active material layer 206. The power storage element 100e' is sealed with the package member 100a to form the cell main body 100b. In the bipolar cell 102' shown in FIG. 6B, the outermost current collector 204a having only the positive electrode active material layer 205 forms the thin plate-shaped positive electrode tab 102p that extends inside the cell main body 100b and leads to the outside of the cell main body 100b. The outermost current collector 204b having only the negative electrode active material layer 206 forms the negative electrode tab 102n that extends inside the cell main body 100b and leads to the outside of the cell main body 100b.

In the illustrated embodiment, both the laminated-type cell 102 illustrated in FIG. 6A and the bipolar cell 102' illustrated in FIG. 6B are disclosed as examples of the second cell 102. Either type of the cell 102 or 102' can be selected based on the required cell capacity and cell voltage.

Figure 8:
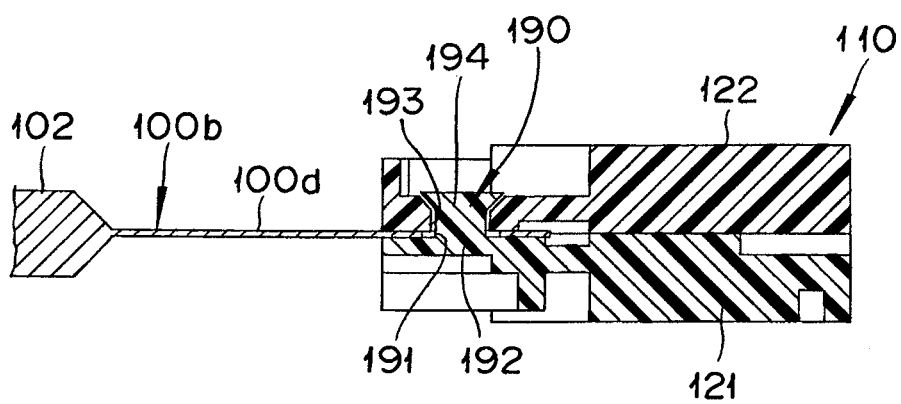
FIG. 8 is a partial cross sectional view of the front side portion of the thin cell coupled to the spacer taken along a section line 8-8 of FIG. 7B in accordance with the illustrated embodiment of the present invention.
Figure 9:
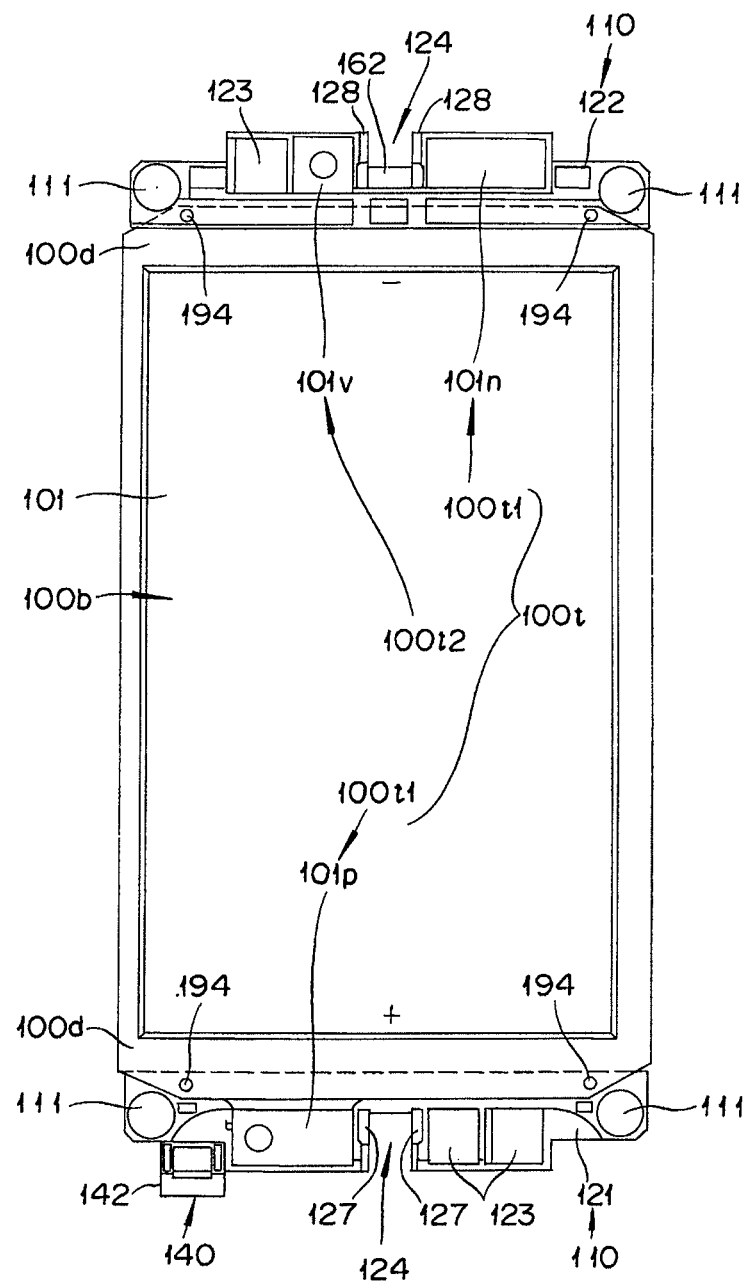
FIG. 9 is a plan view of one of the thin cells illustrated in FIG. 5 with a positive electrode output terminal and the spacer mounted thereto in accordance with the illustrated embodiment of the present invention.
Figure 10A:
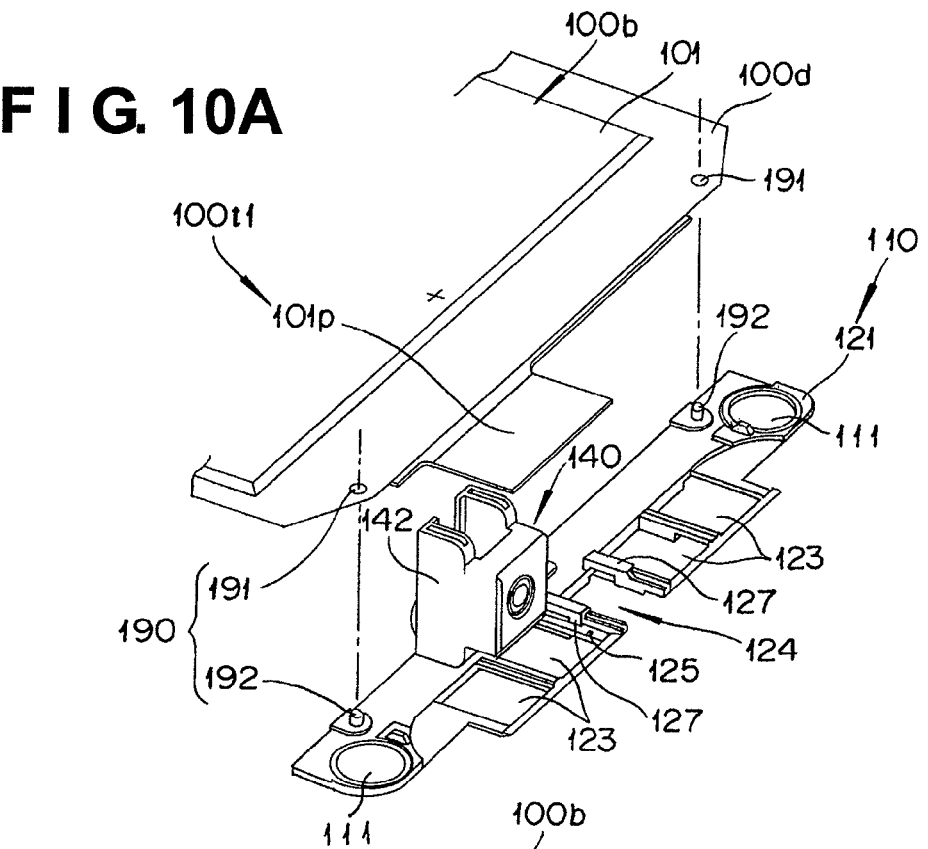
FIG. 10A is an enlarged partial exploded view illustrating a front side portion of the thin cell illustrated in FIG. 9 which is coupled to the positive electrode output terminal and the spacer in accordance with the illustrated embodiment of the present invention.
Figure 10B:
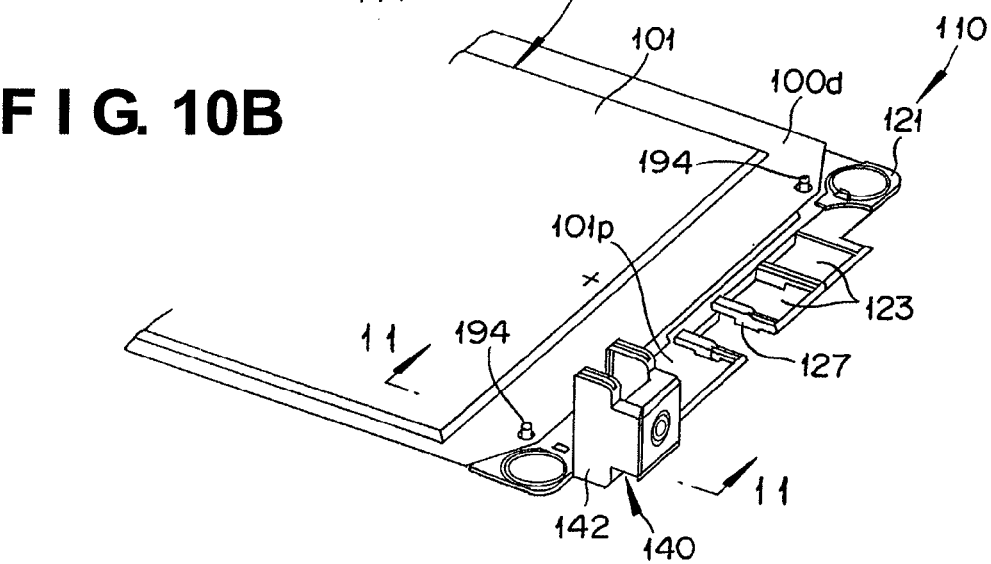
FIG. 10B is an enlarged partial perspective view illustrating a state in which the front side portion of the thin cell illustrated in FIG. 10A is coupled to the positive electrode output terminal and the spacer in accordance with the illustrated embodiment of the present invention.
Figure 11:
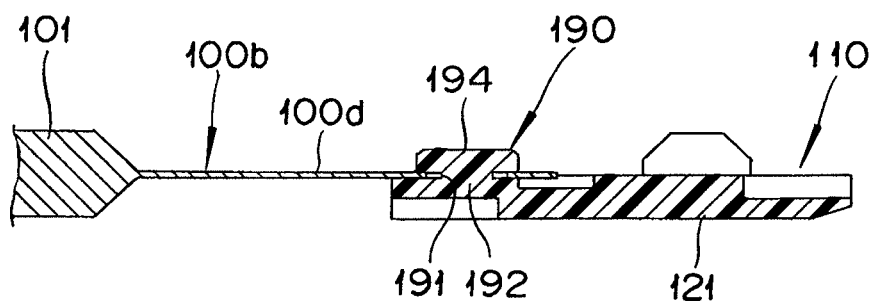
FIG. 11 is a partial cross sectional view of the front side portion of the thin cell coupled to the positive electrode output terminal and the spacer taken along a section line 11-11 of FIG. 10B in accordance with the illustrated embodiment of the present invention.
Figure 12:
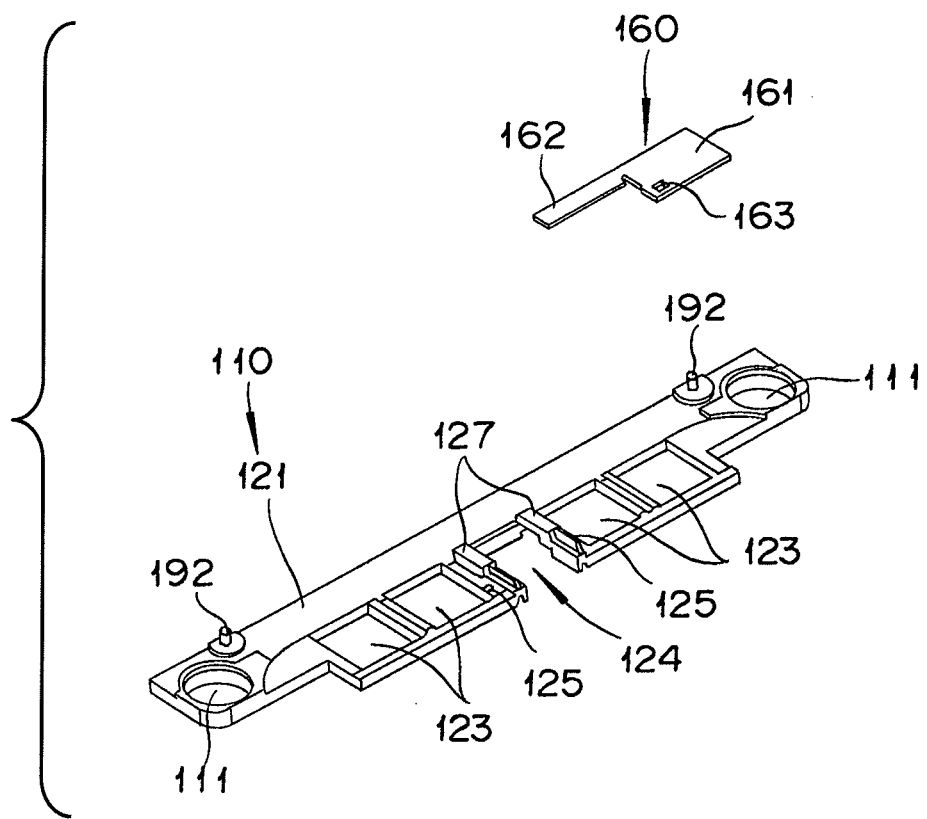
FIG. 12 is an exploded perspective view of the spacer (first spacer) and a voltage detection terminal plate in accordance with the illustrated embodiment of the present invention.
Figure 14A:
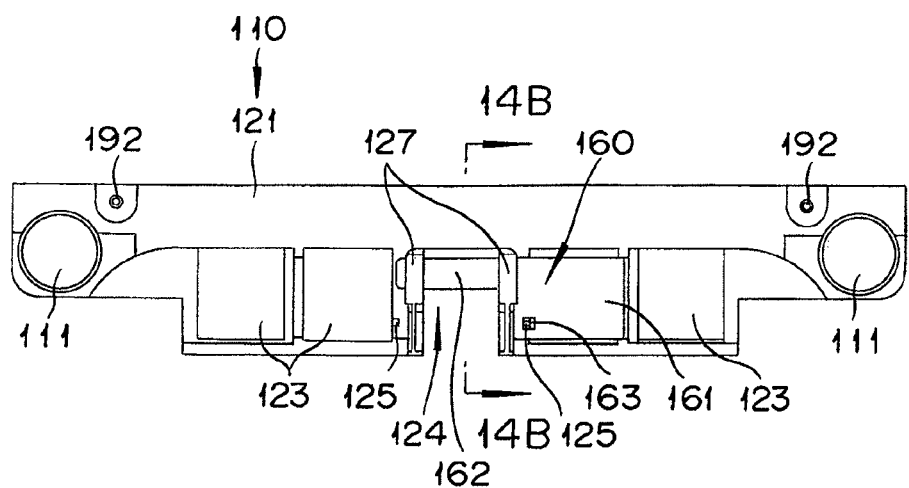
FIG. 14A is a plan view of the spacer illustrated in FIGS. 12, 13A and 13B with the voltage detection terminal plate being attached thereto in accordance with the illustrated embodiment of the present invention.
Figure 14B:
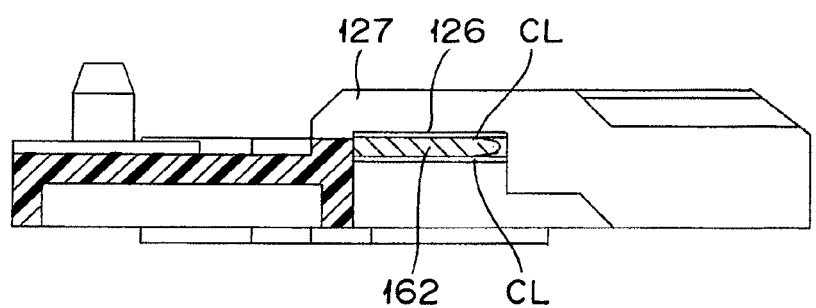
FIG. 14B is a cross sectional view of the spacer taken along a section line 14B-14B of FIG. 14A in accordance with the illustrated embodiment of the present invention.

FIGS. 7A and 7B illustrate how the front side portion of the cell 102 is held by the spacer 110. FIG. 8 is a cross sectional view taken along a section line 8-8 of FIG. 7B. FIG. 9 is a plan view of the first cell 101 with the positive electrode output terminal 140 and the spacer 110 mounted thereto. FIGS. 10A and 10B illustrate how the positive electrode output terminal 140 and the spacer 110 are attached to the front side portion of the first cell 101. FIG. 11 is a cross sectional view taken along a section line 11-11 of FIG. 10B. FIG. 12 is a perspective view showing an example of the spacer 110 (a first spacer portion 121) together with the voltage detection terminal plate 160. FIGS. 13A and 13B illustrate how the voltage detection terminal plate 160 is attached to the spacer 110. FIG. 14A is a plan view showing the spacer 110 with the voltage detection terminal plate 160 attached thereto. FIG. 14B is a cross sectional view taken along a section line 14B-14B of FIG. 14A.

The spacers 110 are used when the cells 101 to 108 are stacked together. If only the electrode tabs 100t are pinched or nipped between the spacers 110, then a structure will be obtained in which the cells 101 to 108 and the spacers 110 are connected at the tab portions alone. Consequently, displacement resulting from vibrations will concentrate at the boundary portions between the electrode tabs 100t and the cell main bodies 100b and cracking or the like could possibly occur at the boundary portions.

Therefore, in the battery module 50 in accordance with the illustrated embodiment, as shown in FIGS. 7A, 7B and 8, the spacers 110 are plate-shaped and configured and arranged to pinch or nip (hold) the electrode tabs 100t and at least a portion of the cell main body 100b of the cell 102 from both surfaces along the stacking direction. Additionally, the spacer 110 is made of electrically insulating material at least at a surface there of that faces the electrode tabs 100t. In the example shown in FIGS. 7A, 7B and 8, the entire spacer 110 is preferably made of electrically insulating material. The material of the spacer 110 is not limited so long as it has an electrically insulating quality and sufficient strength to withstand holding the electrode tabs 100t and a portion of the cell main body 100b in a pinching fashion. For example, a resin material with an electrically insulating quality can be used. A bolt hole 111 for inserting the sleeve 74 (see FIG. 2) is provided in each of the transverse (lengthwise) edge portions of the spacer 110 and passes from the top surface to the bottom surface of the spacer 110.

Since the tabs 100t and a portion of the cell main body 100b are held by the spacers 110, an overlapping portion where the spacers 110 and a portion of the cell main body 100b overlap is obtained. Because of the overlapping portion, the bending points that occur as a result of vibrations are moved from the boundary portions between the electrode tabs 100t and the cell main body 100b to positions within the cell main body 100b. As a result, the bending loads born by the electrode tabs 100t are reduced. When the battery module 50 receives a vibration input, the portion of the cell main body 100b and the electrode tabs 100t vibrate together as a single unit and stress does not concentrate at the boundary portion between the electrode tabs 100t and the cell main body 100b. As a result, the fatigue life of the electrode tabs 100t is improved, and thus, the durability of the battery module 50 can be improved. Although the bending point resulting from vibration is moved into the cell main body 100b, fatigue breakage does not result because the cell main body 100b is enclosed in the package member 100a, and thus, is stronger with respect to vibrations than are the electrode tabs 100t. Since the electrode tabs 100t and a portion of the cell main body 100b are held by the spacer 110, short circuiting between the electrode tabs 100t can be prevented even if the distance between the cells 101 to 108, i.e., the distance between the electrode tabs 100t, is short. Consequently, the distance between the cells 101 to 108 can be made as small as possible and the overall size of the battery module 50 can be made more compact. As a result, the battery module 50 can be provided that is not readily affected by an input of vibration and can be made in a compact size.

In the illustrated embodiment, the cells 101 to 108 are stacked such that the electrode tabs 100t overlap one another in the stacking direction. Consequently, an additional bus bar or the like is not needed to electrically connect the corresponding electrode tabs 100t together because the electrode tabs 100t can be connected together directly by ultrasonic welding or other joining method. As a result, an additional structural component is not added to the electrode tabs 100t and the electrode tab portion is lighter, which is advantageous with respect to vibration.

It is necessary for the spacers 110 to insulate the electrode tabs 100t that are not connected together. Since the spacers 110 are coupled to the cell main bodies 100b as explained previously, an additional structural component is not attached to the electrode tabs 100t and the electrode tab portion is lighter, which is advantageous with respect to vibration.

As shown in FIGS. 7A, 7B and 8, the spacers 110 are generally divided into two forms including a first spacer 121 and a second spacer 122. The first spacer 121 is shaped such that the first spacer 121 can be attached to the voltage detection terminal plate 160. The second spacer 122 is shaped such that the second spacer 122 cannot be attached to the voltage detection terminal plate 160. The detail structure of the first spacer 121 is illustrated in FIGS. 12 to 14.

As shown in FIGS. 12 to 14, the first spacer 121 has several generally rectangular window-shaped openings 123 that pass from a top surface through a bottom surface of the first spacer 121 in the stacking direction. A generally U-shaped portion 124 (notch) is provided in a lengthwise middle portion of the first spacer 121. Two of the window-shaped openings 123 are arranged on each of the left and right sides of the generally U-shaped portion 124. A pair of protrusions 125 is provided between the generally U-shaped portion 124 and the adjacent window-shaped openings 123, respectively. The electrode tabs 100t held by the spacer 110 are generally aligned in the window-shaped openings 123 (see FIG. 7B). The first spacer 121 further includes a pair of holding parts 127 with each of the holding part having a hole 126 as best shown in FIG. 14B.

As shown in FIG. 12, the voltage detection terminal plate 160 is a one-piece unitary member having a generally rectangular base portion 161 and a terminal portion 162 that extends from the base portion 161. A through hole 163 configured and arranged to allow the protrusion 125 provided on the first spacer 121 to fit therein is formed in the base portion 161. The base portion 161 is fixed to the first spacer 121 by fitting one of the protrusions 125 into the through hole 163 as shown in FIG. 13B and FIG. 14. The base portion 161 is connected to the electrode tabs 100t2 (101v to 108v) that correspond to the second electrode. The holding parts 127 having the holes 126 allow the terminal portion 162 to be inserted therein. The holding parts 127 are respectively provided on each of both sides of the generally U-shaped portion 124 such that the holding parts 127 are spaced apart from each other along lengthwise direction of the first spacer 121. The holes 126 are formed along the lengthwise direction of the first spacer 121 (i.e., such that the openings face in the lengthwise direction of the first spacer 121). The dimension of the holes 126 in the thickness direction of the terminal portion 162 is larger than the thickness of the terminal portion 162 such that a clearance CL exists between the terminal portion 162 and the holding part 127 on both of the sides of the terminal portion 162 that face in the thickness direction (see FIG. 14B). The clearance CL allows the terminal portion 162 to be held by the first spacer 121 in such a manner that the terminal portion 162 can move in the stacking direction.

If the terminal portions 162 of the voltage detection terminal plates 160 were fixed with respect to the spacers 110, then the position and pitch of the terminal portions 162 in the stacking direction would be determined based on the positions assumed by the cells 101 to 108 when the cells 101 to 108 and the spacers 110 were stacked together. Consequently, variation (scatter) in the thickness dimensions of the cells 101 to 108 and the thickness dimensions of the spacers 110 would cause the positions of the terminal portions 162 to be uneven within the battery module 50 as a whole. The connector 170 has a plurality of connection terminals 173 (see FIG. 19, which will be explained later) that are configured to connect to the terminal portions 162 of the voltage detection terminal plates 160, and the positions of the connection terminals 173 are predetermined. Thus, if the positions of the terminal portions 162 are uneven, then it will be difficult to insert the connector 170 and poor contact may occur between the connection terminals 173 and the terminal portions 162 if the connector 170 is forcefully inserted.

Therefore, by configuring the parts such that the terminal portions 162 are held by the first spacers 121 in such a manner that the terminal portions 162 can move (are in a floating state) in the stacking direction, the variation of the thickness dimensions of the cells 101 to 108 and the variation of the thickness dimensions of the spacers 110 can be absorbed and the task of connecting the connector 170 can be accomplished more easily.

As shown in FIGS. 13A and 13B, when the voltage detection terminal plate 160 is installed into the first spacer 121, the terminal portion 162 is inserted into the holes 126 of the holding parts 127 by moving the voltage detection terminal plate 160 along the lengthwise direction of the first spacer 121 until the protrusion 125 of the first spacers 121 fits into the through hole 163 of the base portion 161. In this way, the base portion 161 of the voltage detection terminal plate 160 is fixed to the first spacer 121 and the terminal portion 162 of the voltage detection terminal plate 160 is held by the first spacer 121 in such a manner that the voltage detection terminal plate 160 can move in the stacking direction. The voltage detection terminal plate 160 can be installed in the first spacer 121 with the base portion 161 on either side (left or right) of the U-shaped portion 124. FIG. 13B and FIG. 14 depict the voltage detection terminal plate 160 installed in the first spacer 121 such that the base portion 161 is arranged on the right side of the U-shaped portion 124 (i.e., the right side from the perspective of FIGS. 13B and 14). On the other hand, FIGS. 7A and 7B depict the voltage detection terminal plate 160 installed in the first spacer 121 such that the base portion 161 is arranged on the left side of the U-shaped portion 124 (i.e., the left side from the perspective of FIGS. 7A and 7B).

As shown in FIG. 7A, the second spacer 122 is provided with a pair of ribs 128 arranged to overlap with the holding parts 127 of the first spacer 121.

The package member 100a has a bag-shape formed by joining outside edge portions of a pair of sheet members 100c together so as to obtain a flange portion 100d (joint portion) formed on each of the front and rear sides of the cell main body 100b. The electrode tabs 100t are configured and arranged protrude outwardly from between the two sheet members 100c. The spacers 110 are configured to pinch or nip the flange portion 100d and the electrode tabs 100t from both surfaces (top and bottom surfaces) in the stacking direction.

As shown in FIG. 7A, the battery module 50 also has several coupling parts 190 arranged to couple the flange portion 100d of each of the cells 101 to 108 to the respective pair of the first and second spacers 121 and 122 of the spacers 110. The coupling parts 190 enable the cells 101 to 108 to be positioned with respect to the spacers 110. Additionally, when the battery module 50 receives a vibration input, the vibration input can be dispersed into the two sheet members 100c at the flange portions 100d through the coupling parts 190. As a result, the concentration of stress in the boundary portions between the electrode tabs 100t and the cell main bodies 100b can be further suppressed and the fatigue life of the electrode tabs 100t can be further improved.

Each of the coupling parts 190 includes a through hole 191 passing through the flange portion 100d of each of the cells 101 to 108 in the stacking direction and an engagement part 192 configured to fit into the through hole 191 provided in the first spacer 121. Since the through hole 191 is opened in the flange portion 100d and does not pass through the electrode tabs 100t1, the size of the electrode tabs 100t1 can be determined solely based on the surface area that is required to connect one electrode tab 100t1 to another electrode tab 100t1. Therefore, the electrode tabs 100t1 do not need to be larger than what is required for the connection. Since the electrode tabs 100t1 can be made smaller, the size of each of the cells 101 to 108 can be made more compact, and thus, the entire battery module 50 can be made more compact.

The engagement part 192 is a pin formed on the first spacer 121 so as to protrude in the stacking direction. The engagement part 192 is also referred to as an embossment. Each of the first spacers 121 is provided with two engagement parts 192 with one of the engagement parts 192 being arranged near each of the lengthwise end portions of the first spacer 121. Each of the second spacers 122 is provided with a pair of through holes 193 (engaging holes) arranged for the engagement parts 192 to be inserted therein.

A head portion 194 is formed on a distal end of each of the engagement parts 192 by crushing the distal end after the engagement part 192 is passed through the through hole 191 and the through hole 193. The head portions 194 serve to prevent the engagement parts 192 from pulling out of the through holes 191 (i.e., serve to retain the engagement parts 192 in the through holes 193), and thus, fasten the cells 101 to 108 and the spacers 110 together. The engagement part 192 of the first spacer 121 alone or the engagement part 192 of the first spacer and the through hole 193 of the second spacer 122 constitute the coupling structure provided with the spacers 110.

More specifically, FIGS. 7A, 7B and 8 illustrate the coupling parts 190 of the spacer 110 on the front side of the second cell 102. The engagement parts 192 of the first spacer 121 are inserted through the through holes 191 of the cell 102 and the through holes 193 of the second spacer 122. The distal ends (tip ends) of the engagement parts 192 are then crushed (deformed) using head or ultrasonic waves so as to form the head portions 194 that are at least larger than hole diameters of the through holes 191 of the cell 102. The head portions 194 prevent the engagement parts 192 from becoming detached from the through holes 191 of the cell 102 and serve to securely couple the first spacer 121, the flange portion 100d of the cell 102, and the second spacer 122 together.

On the other hand, as shown in FIGS. 9, 10A, 10B and 11, at the front side of the first cell 101, the engagement parts 192 of the first spacer 121 are passed through the through holes 191 formed in the flange portion 100d of the cell 101. The distal ends of the engagement parts 192 are then deformed to form the head portions 194. The head portions 194 prevent the engagement parts 192 from becoming detached from the through holes 191 of the cell 101 and serve to securely couple the first spacer 121 and the flange portion 100d of the cell 101 together.

The coupling part 190 serves both to position the cells 101 to 108 and the spacers 110 and to fasten the cells 101 to 108 and the spacers 110 to one another. Since the same coupling parts 190 are used for both positioning and fastening, space is saved in comparison with a structure in which separate positioning and fastening parts are used. Therefore, the battery module 50 can be made more compact. Additionally, since the cells 101 to 108 and the spacers 110 are not separated, the cells 101 to 108 and the spacers 110 can be handled more easily and the work of stacking the cells 101 to 108 can be accomplished more easily.

Each of the cells 101 to 108 is provided with the electrode tab 100t2 (101v to 108v) for connecting to the base portion 161 of the respective voltage detection terminal plate 160 and the electrode tabs 100t1 (101p to 108p and 101n to 108n) for connecting the cells 101 to 108 together. The electrode tabs 100t2 are separate and independent from the electrode tabs 100*t*1. Although vibrations are transmitted to the voltage detection terminal plates 160 through the connector 170, the vibrations are not inputted directly to the electrode tabs 100*t*1 because the electrode tabs 100*t*1 are separate and independent from the electrode tabs 100*t*2. As a result, the durability of the electrode tabs 100*t*1 can be improved.

One of a pair of the spacers 110 (e.g., the first spacer 121 or the second spacer 122) that pinches and holds the electrode tabs 100*t* and a portion of the cell main body 100*b* of any one of the cells 101 to 108 is used in a shared manner as one of another pair of the spacers 110 that pinches and holds the electrode tabs 100*t* and a portion of the cell main body 100*b* of another one of the cells 101 to 108. For example, the front side portion of the first cell 101 is pinched and held between the first spacer 121 attached to the first cell 101 and another first spacer 121 attached to the under side of the second cell 102 (see FIG. 15). In this example, the first spacer 121 attached to the second cell 102 is used simultaneously both to pinch and hold the negative electrode tab 102*n* and a portion of the cell main body 100*b* of the second cell 102 and to pinch and hold the positive electrode tab 101*p* and a portion of the cell main body 100*b* of the first cell 101. By sharing the spacers 110 in this way, the distances between the electrode tabs 100*t* of the upper cell (e.g., the second cell 102) and the electrode tabs 100*t* of the lower cell (e.g., the first cell 101) can be reduced. Consequently, the distance between the cells 101 to 108 can be made as small as possible and the overall size of the battery module 50 can be made more compact.

Referring now to FIGS. 15 to 20, the attachment structure of the connector 170 and the holder 180 to the battery module 50 will be described in detail.

Figure 15:
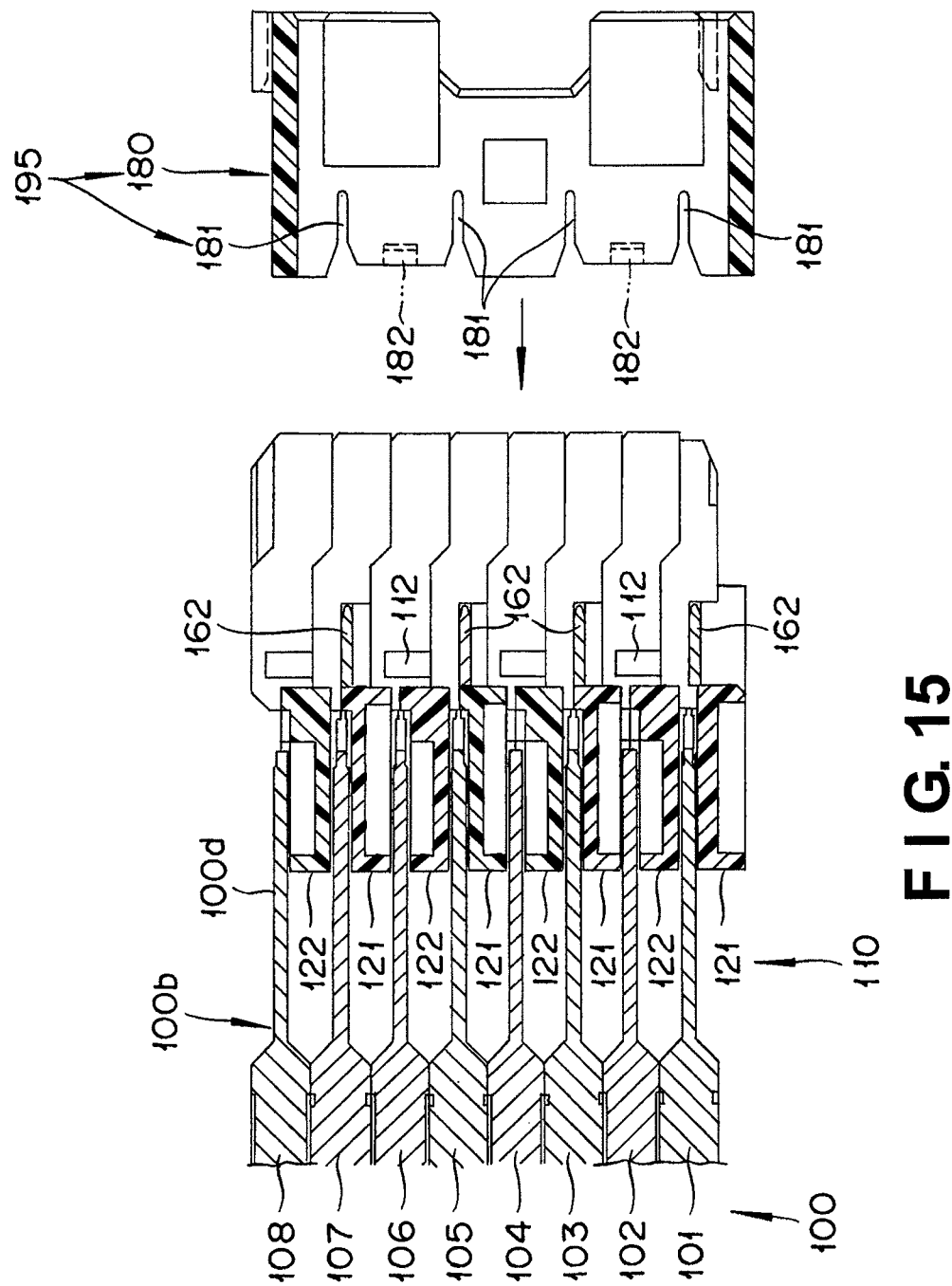
FIG. 15 is a partial cross sectional view of the cell unit illustrated in FIG. 3 taken along a section line 15-15 of FIG. 3 in accordance with the illustrated embodiment of the present invention.
Figure 16A:
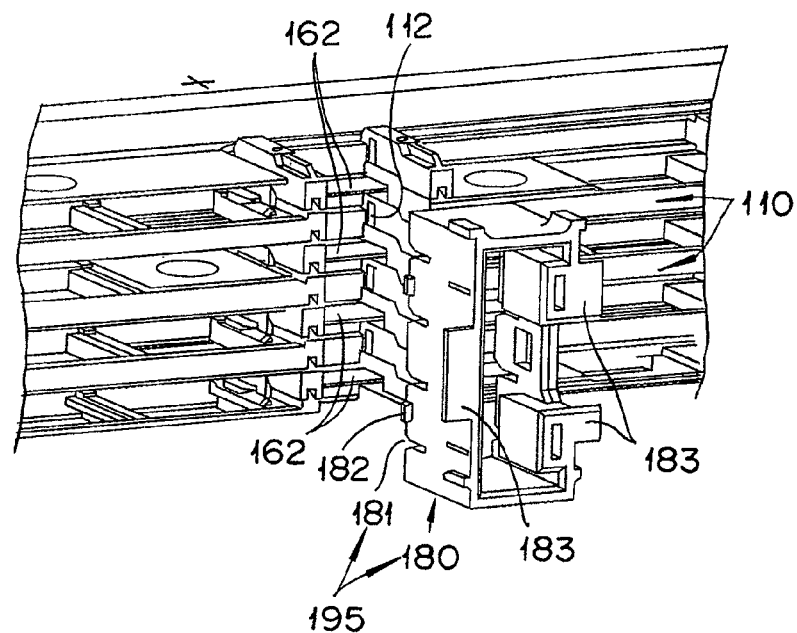
FIG. 16A is a partial perspective view of a portion of the cell unit illustrated in FIGS. 3 and 15 and a holder for holding a connector before the holder is attached to the spacers in accordance with the illustrated embodiment of the present invention.
Figure 16B:
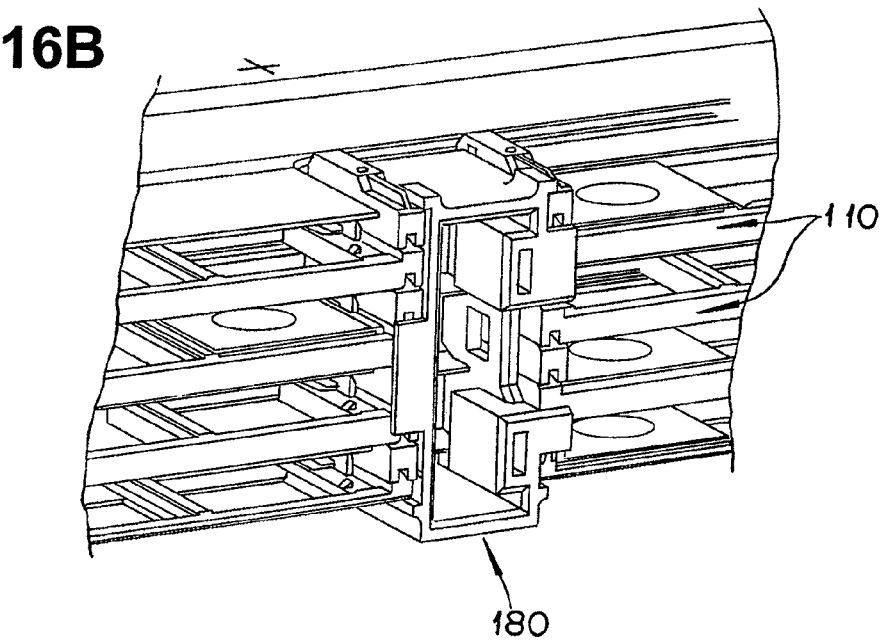
FIG. 16B is a partial perspective view of the portion of the cell unit and the holder after the holder has been attached to the spacers in accordance with the illustrated embodiment of the present invention.
Figure 18A:
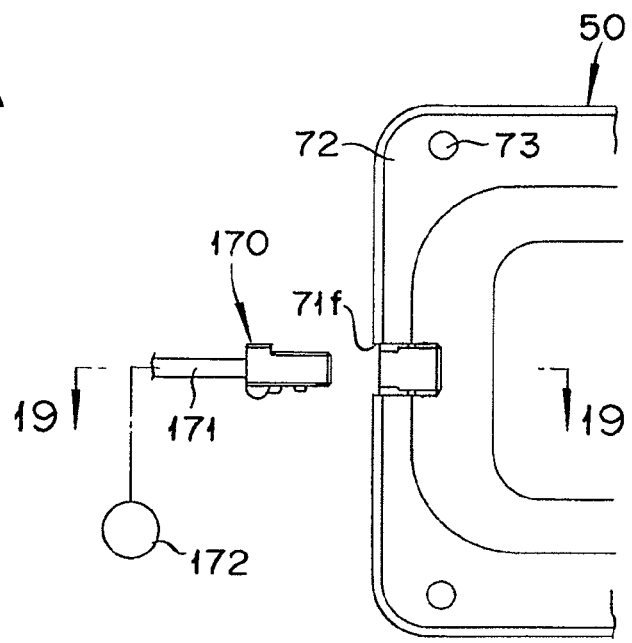
FIG. 18A is a partial plan view of the battery module illustrated in FIG. 1 with the connector before the connector is inserted into the battery module in accordance with the illustrated embodiment of the present invention.
Figure 18B:
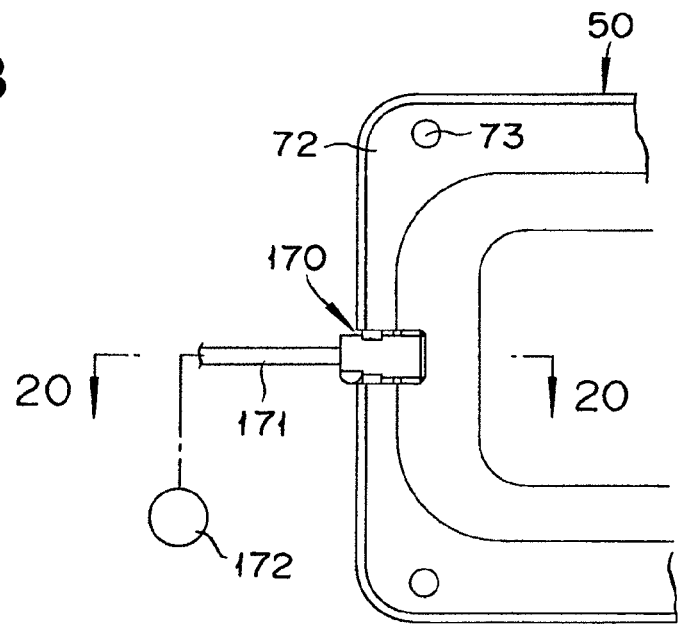
FIG. 18B is a partial plan view of the battery module illustrated in FIGS. 1 and 18A after the connector has been inserted into the battery module in accordance with the illustrated embodiment of the present invention.
Figure 19:
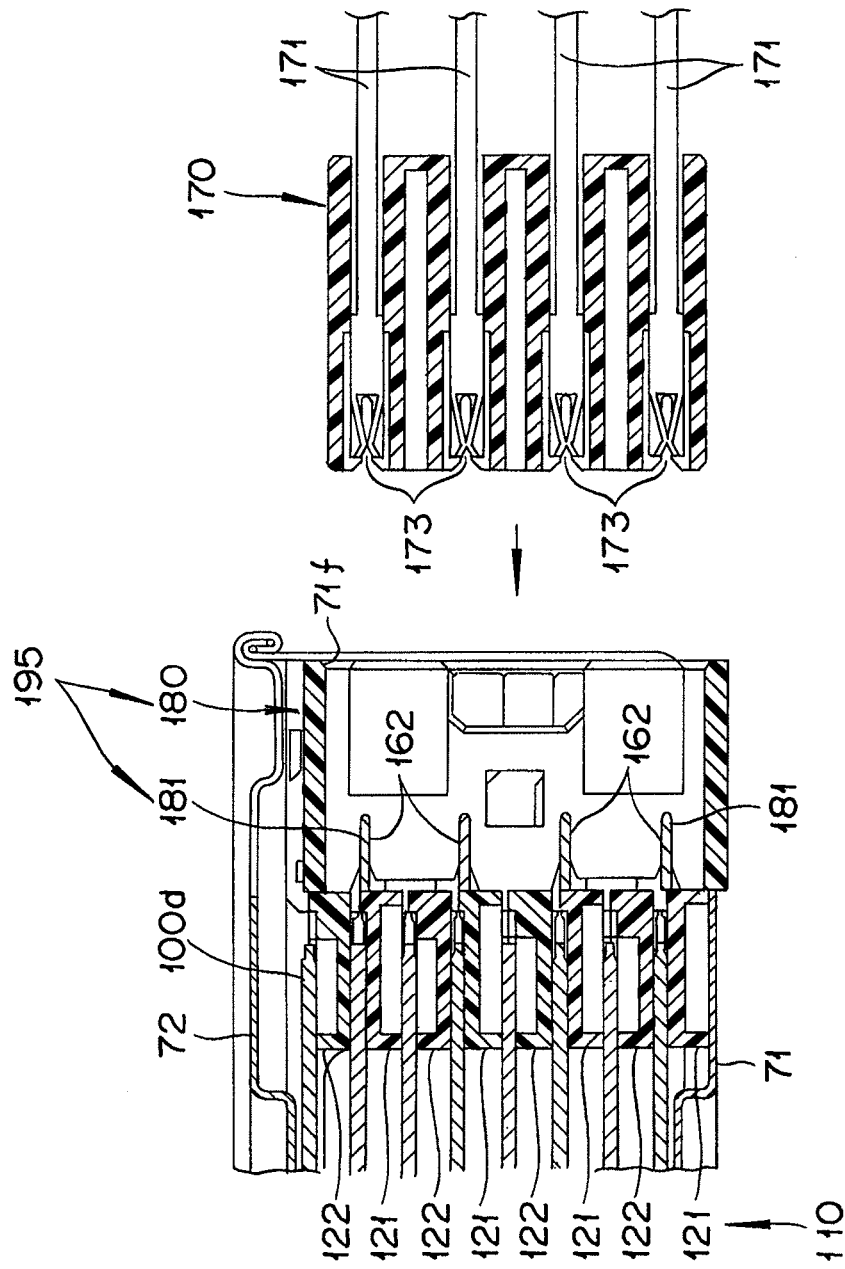
FIG. 19 is a partial cross sectional view of the battery module and the connector taken along a section line 19-19 of FIG. 18A in accordance with the illustrated embodiment of the present invention.

FIG. 15 is a partial cross sectional view of the rear side of the battery module 50 taken along a section line 15-15 of FIG. 3. FIG. 16A is a perspective view of the holder 180 for holding the connector 170 before the holder 180 is attached to the spacers 110. FIG. 16B is a perspective view of the holder 180 after the holder 180 has been attached to the spacers 110. FIG. 17 is a frontal view of the holder 180 after the holder 180 has been attached to the spacers 110. FIG. 18A is a plan view showing the connector 170 before the connector 170 is inserted into the battery module 50. FIG. 18B is a plan view showing the connector 170 after the connector 170 has been inserted into the battery module 50. FIG. 19 is a cross sectional view taken along a section line 19-19 of FIG. 18A. FIG. 20 is a cross sectional view taken along a section line 20-20 of FIG. 18B. The connectors 170 are installed in both the front side and the rear side of the battery module 50 although FIGS. 15 to 20 show only the rear side of the battery module 50.

As explained previously, the terminal portions 162 of the voltage detection terminal plates 160 are held in a floating manner by the spacers 110 in order to absorb variation in the thickness dimensions of the cells. Since the connection terminals 173 (see FIGS. 19 and 20) of the connectors 170 are arranged in predetermined positions, the task of connecting the connectors 170 can be accomplished more easily by positioning the terminal portions 162 in accordance with the positions of the connection terminals 173.

Therefore, as shown in FIG. 15, the battery module 50 in accordance with the illustrated embodiment has a restricting member 195 that serves to determine the positions of the terminal portions 162 in the stacking direction. Thus, the connector 170 provided with the connection terminals 173 can be connected to the terminal portions 162, whose positions in the stacking direction have been determined by the restricting member 195.

As shown in FIGS. 15 and 16A, the restricting member 195 includes the holder 180 that is mounted to the spacers 110 and several slits 181 formed in the holder 180. The holder 180 is configured and arranged to hold the connector 170. The slits 181 are arranged such that a portion of each of the terminal portions 162 is inserted into a corresponding one of the slits 181. The holder 180 is inserted into an insertion opening formed by the generally U-shaped portions 124 of the spacers 110. The slits 181 are formed from the side corresponding to the distal end of the holder 180 when the holder 180 is inserted. The slits 181 are formed in positions corresponding to the positions of the connection terminals 173 (FIG. 19). The holder 180 further includes several claw-shaped parts 182 (coupling parts) provided on outwardly facing sides of the holder 180. The claw-shaped parts 182 are configured and arranged to respectively engage with several engaging holes 112 formed in the spacers 110. When the holder 180 is push in such that the claw-shaped parts 182 engage with the engaging holes 112 of the spacers 110, the holder 180 is securely attached to the spacers 110. Since the terminal portions 162 of the voltage detection terminal plates 160 are held by the spacers 110 in a floating state, the positions of the terminal portions 162 are adjusted to positions corresponding to the positions of the connection terminals 173 of the connector 170 when the terminal portions 162 enter into the respective slits 181 as shown in FIGS. 18A and 19.

As described above, the battery module 50 has the case 70 in which the cell group 100, the spacers 110, and the holder 180 are housed. The case 70 has the insertion opening 71*f* configured to allow the connector 170 to be inserted into the holder 180 from the outside of the case 70. In FIG. 17, the insertion opening 71*f* is indicated with a double-dot chain line. As shown in FIGS. 16A and 16B, the holder 180 further includes several stoppers 183 that abut against an inner side of a wall surface surrounding the insertion opening 71*f*. By abutting against the inner side of the wall surface, the stoppers 183 can prevent the holder 180 from being pulled out of the insertion opening 71*f* even if the connector 170 is pulled out of the holder 180 after having been inserted.

As shown in FIGS. 18B and 20, when the connector 170 is connected to the battery module 50, the terminal portions 162 of the voltage detection terminal plates 160 and the connection terminals 173 are connected together readily. The task of connecting the connector can be accomplished relatively easily because the positions of the terminal portions 162 are determined in accordance with the positions of the connection terminals 173.

FIGS. 21A and 21B are simplified cross sectional views showing first and second examples of the material of the spacers 110 in accordance with the illustrated embodiment.

It is acceptable for the spacers 110 to be made of an elastic material member 113, as shown in FIG. 21A. The stresses that develop in the electrode tabs 100*t* and the cell main bodies 100*b* can be dispersed and reduced by the elastic material member 113 and the durability of the electrode tabs 100*t* can be improved. The elastic material member 113 can also serve to absorb the step-shaped contour that exists at the boundary portions between the electrode tabs 100*t* and the cell main bodies 100*b*. Examples of materials that can be used as the elastic material member 113 include, but not limited to, chloroprene rubber (CR), butyl rubber (IIR), natural rubber (NR), butadiene rubber (BR), and styrene butadiene rubber (SBR). It is preferable to use the elastic material member 113 having a comparatively high coefficient of friction. The electrode tabs 100*t* and the cell main bodies 100*b* can be held by the friction force generated by pinching the elastic material member 113. Although the coefficient of friction of the elastic material member 113 will vary depending on the temperature and the manner in which the elastic material member 113 is pressed, the movement of the electrode tabs 100*t* and the cell main bodies 100*b* can be restricted with friction forces by using a coefficient of friction of approximately 2.0 or higher.

It is also acceptable for the spacer 110 to be made by layering the elastic material member 113 and an inelastic material member 114 as shown in FIG. 21B. By adopting a laminated structure comprising layers of the elastic material member 113 and the inelastic material member 114, the pinching force of the spacers 110 can be set to any desired strength value by varying the ratio of elastic material member 113 to the inelastic material member 114. In the spacers 110 adopting this structure, it is preferable for the surface of the spacer 110 that faces the portion of the cell main body 100*b* and the electrode tabs 100*t* to be made of the elastic material member 113 so that, in addition to ensuring that a sufficient pinching force can be obtained, the vibrations inputted to the electrode tabs 100*t* and the cell main bodies 100*b* can be reduced and the durability of the electrode tabs 100*t* can be improved. The materials mentioned previously can be used for the elastic material member 113. Examples of the inelastic material member 114 include, but not limited to, polycarbonate (PC) or other resin material having less elasticity than the elastic material 13 mentioned previously.

The spacers 110 having the laminated structure comprising layers of the elastic material member 113 and the inelastic material member 114 is not limited to the two-layered structure shown in FIG. 21B. For example, a three-layered structure comprising a layer of the inelastic material member 114 sandwiched between two layers of the elastic material member 113 can be adopted. Another feasible structure is to make the spacer 110 by coating the surface of the inelastic material member 114 with the elastic material member 113 so as to form a film of the elastic material member 113 on the surface of the inelastic material member 114.

Accordingly, with the battery module 50 of the illustrated embodiment of the present invention, when the battery module 50 is subjected to an input of vibration, stresses do not concentrate at the boundary portions between the electrode tabs 100*t* and the cell main bodies 100*b* because the electrode tabs 100*t* and at least a portion of each of the cell main bodies 100*b* vibrate as integral units. As a result, the fatigue life of the electrode tabs 100*t* is improved, and thus, the durability of the battery module 50 is improved.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A battery module comprising:
   a plurality of flat cells with each of the flat cells having a cell main body and at least one electrode tab, the cell main body including a power storage element sealed in a package member, the electrode tab being electrically connected to a power generating member and protruding outwardly from the package member of the cell main body, the flat cells being stacked on one another such that the electrode tabs are electrically connected in a stacking direction; and
   a plurality of nipping plates with adjacent ones of the nipping plates in the stacking direction nipping both the electrode tab and a portion of the package member of the cell main body of a corresponding one of the flat cells from both opposite side surfaces of the corresponding one of the flat cells along the stacking direction,
   each of the package members of the cell main bodies having a bag-shape formed by a pair of sheet members joined together to form a joint portion disposed at an outside edge area of the package member,
   at least one of the adjacent ones of the nipping plates having a coupling structure that couples the joint portion of the package member of the corresponding one of the flat cells thereto, the coupling structure including a pin formed on one of the adjacent ones of the nipping plates with the pin passing through a through hole provided in the joint portion of the package member of the corresponding one of the flat cells, and an engaging hole formed on the other one of the adjacent ones of the nipping plates such that the engaging hole engages the pin after the pin passes through the through hole, the at least one electrode tab extending from an end of the joint portion and the pin not passing through the at least one electrode tab.

2. The battery module recited in claim 1, wherein the nipping plates are made of electrically insulating material.

3. A battery module comprising:
   a plurality of flat cells with each of the flat cells having a cell main body and at least one electrode tab, the cell main body including a power storage element sealed in a package member, the electrode tab being electrically connected to a power generating member and protruding outwardly from the cell main body, the flat cells being stacked on one another such that the electrode tabs are electrically connected in a stacking direction; and
   a plurality of nipping plates with adjacent ones of the nipping plates in the stacking direction nipping the electrode tab and a portion of the cell main body of a corresponding one of the flat cells from both opposite side surfaces of the corresponding one of the flat cells along the stacking direction,
   each of the package members of the cell main bodies having a bag-shape formed by a pair of sheet members joined together to form a joint portion disposed at an outside edge area of the package member, each of the electrode tabs protruding outwardly from between the sheet members of a corresponding one of the package members, and the nipping plates nipping the joint portions of the package members and the electrode tabs from the opposite side surfaces of the corresponding one of the flat cells along the stacking direction, at least one of the adjacent ones of the nipping plates having a coupling structure that couples the joint portion of the package member of the corresponding one of the flat cells thereto, the coupling structure including a pin formed on one of the adjacent ones of the nipping plates and the pin passing through a through hole provided in the joint portion of the package member of the corresponding one of the flat cells, and an engaging hole formed on the other one of the adjacent ones of the nipping plates such that the engaging hole engages the pin after the pin passes through the through hole, the at least one electrode tab extending from an end of the joint portion and the pin not passing through the at least one electrode tab.

4. The battery module recited in claim 3, wherein the pin has a head part formed at a distal end of the pin to retain the pin in the through hole.

5. The battery module recited in claim 1, wherein a portion of each of the nipping plates that faces the electrode tab is made of elastic material.

6. The battery module recited in claim 5, wherein each of the nipping plates is made by stacking an elastic material layer and an inelastic material layer.

7. The battery module recited in claim 1, wherein both a portion of each of the nipping plates that faces a corresponding one of the electrode tabs and a portion of each of the nipping plates that faces the cell main body of the corresponding one of the flat cells are made of elastic material.

8. The battery module recited in claim 1, wherein each of the electrode tabs includes a first electrode tab that connects one of the flat cells to an adjacent one of the flat cells and a second electrode tab that is used to detect a voltage of the corresponding one of the flat cells.

9. The battery module recited in claim 8, wherein the first and second electrode tabs are separate and independent entities.

10. The battery module recited in claim 9, wherein at least one of the nipping plates includes a voltage detection terminal plate having a base section and a terminal section, the base section being electrically connected to the second electrode of the corresponding one of the flat cells, the terminal section being freely movable in the stacking direction.

11. The battery module recited in claim 10, further comprising
a holder attached to the nipping plates to couple a voltage detection connector thereto.

12. The battery module recited in claim 11, wherein the holder has a restricting part that restricts a position of the voltage detection terminal plate in the stacking direction.

13. The battery module recited in claim 12, wherein the restricting part of the holder includes a slit formed in the holder.

14. The battery module recited in claim 13, further comprising
a case housing the flat cells, the nipping plates, and the holder, the case having an insertion opening for inserting the voltage detection connector into the holder from an outside of the case with the holder having a stopper abutting against an inner side of a wall surface of the case surrounding the insertion opening.

15. A battery module comprising:
energy storage means for storing electrical energy with electrode tabs protruding outwardly from corresponding ones of package members of cell main bodies that are stacked on one another such that the electrode tabs are electrically connected in a stacking direction; and nipping means for nipping both the electrode tabs and the package members of the cell main bodies of the flat cells from both opposite side surfaces of the flat cells along the stacking direction, each of the package members of the cell main bodies having a bag-shape formed by a pair of sheet members joined together to form a joint portion disposed at an outside edge area of the package member, the nipping means having coupling means for coupling the joint portion of the package member of the corresponding one of the flat cells thereto, the coupling means including a pin formed on the nipping means and the pin passing through a through hole provided in the joint portion of the package member of the corresponding one of the flat cells, and an engaging hole formed on the nipping means such that the engaging hole engages the pin after the pin passes through the through hole, the electrode tabs extending from an end of the joint portion and the pin not passing through the electrode tabs.

* * * * *